United States Patent
Furuyama et al.

(10) Patent No.: US 7,352,935 B2
(45) Date of Patent: Apr. 1, 2008

(54) OPTOELECTRONIC CONVERSION HEADER, LSI PACKAGE WITH INTERFACE MODULE, METHOD OF MANUFACTURING OPTOELECTRONIC CONVERSION HEADER, AND OPTICAL INTERCONNECTION SYSTEM

(75) Inventors: Hideto Furuyama, Yokohama (JP); Hiroshi Hamasaki, Hiratsuka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 98 days.

(21) Appl. No.: 11/204,168

(22) Filed: Aug. 16, 2005

(65) Prior Publication Data
US 2006/0039658 A1    Feb. 23, 2006

(30) Foreign Application Priority Data
Aug. 17, 2004 (JP) .............................. 2004-237456
Mar. 31, 2005 (JP) .............................. 2005-100312

(51) Int. Cl.
*G02B 6/26* (2006.01)
*G02B 6/36* (2006.01)
*G02B 6/00* (2006.01)

(52) U.S. Cl. .............................. 385/52; 385/90; 385/14

(58) Field of Classification Search .................. 385/52, 385/90, 14
See application file for complete search history.

(56) References Cited

U.S. PATENT DOCUMENTS

| | | | | |
|---|---|---|---|---|
| 5,412,748 | A * | 5/1995 | Furuyama et al. | 385/92 |
| 5,467,419 | A * | 11/1995 | Roff et al. | 385/92 |
| 6,908,779 | B2 * | 6/2005 | Ogawa et al. | 438/27 |
| 7,118,294 | B2 * | 10/2006 | Hamasaki et al. | 385/89 |
| 7,198,412 | B2 * | 4/2007 | Hamasaki et al. | 385/88 |
| 2004/0218372 | A1 | 11/2004 | Hamasaki et al. | |
| 2004/0223703 | A1 * | 11/2004 | Miyamae et al. | 385/88 |
| 2005/0063651 | A1 * | 3/2005 | Hamasaki et al. | 385/100 |
| 2005/0141824 | A1 | 6/2005 | Furuyama et al. | |
| 2005/0156304 | A1 | 7/2005 | Furuyama et al. | |
| 2005/0169596 | A1 | 8/2005 | Hamasaki et al. | |
| 2006/0039658 | A1 * | 2/2006 | Furuyama et al. | 385/90 |
| 2006/0147158 | A1 * | 7/2006 | Sato et al. | 385/78 |

(Continued)

FOREIGN PATENT DOCUMENTS

JP    61-180522    11/1986

(Continued)

OTHER PUBLICATIONS

U.S. Appl. No. 11/472,367, filed Jun. 22, 2006, Hamasaki et al.

(Continued)

*Primary Examiner*—K. Cyrus Kianni
(74) *Attorney, Agent, or Firm*—Oblon, Spivak, McClelland, Maier & Neustadt, P.C.

(57) ABSTRACT

In an optoelectronic conversion header, a ferrule holds an optical waveguide in a predetermined position so that an end face of the optical waveguide protrudes from an mounting surface of the ferrule. An electric wire is provided on the mounting surface of the ferrule, a optical semiconductor device is mounted on the mounting surface of the ferrule and electrically connected to the electric wire. From the end face of the optical waveguide, an optical signal is transferred in a transfer direction and the mounting surface of the ferrule is so arranged as to be deviated two degrees or more from a plane vertical to the transfer direction.

4 Claims, 15 Drawing Sheets

U.S. PATENT DOCUMENTS

2006/0215969 A1* 9/2006 Hamasaki et al. ............ 385/89

FOREIGN PATENT DOCUMENTS

| JP | 3-65903 | 3/1991 |
| JP | 6-118250 | 4/1994 |
| JP | 2000-347072 | 12/2000 |
| JP | 2001-281503 | 10/2001 |
| JP | 2001-284608 | 10/2001 |
| JP | P2001-281503 A * | 10/2001 |
| JP | 2004-131323 | 4/2004 |

OTHER PUBLICATIONS

U.S. Appl. No. 11/496,446, filed Aug. 1, 2006, Furuyama et al.
U.S. Appl. No. 11/531,922, filed Sep. 14, 2006, Hamsaski et al.
U.S. Appl. No. 11/233,175, filed Sep. 23, 2005, Furuyama et al.
U.S. Appl. No. 11/204,168, filed Aug. 16, 2005, Furuyama et al.
U.S. Appl. No. 11/203,959, filed Aug. 16, 2005, Hamasaki et al.
U.S. Appl. No. 11/442,276, filed May 30, 2006, Hamasaki et al.

* cited by examiner

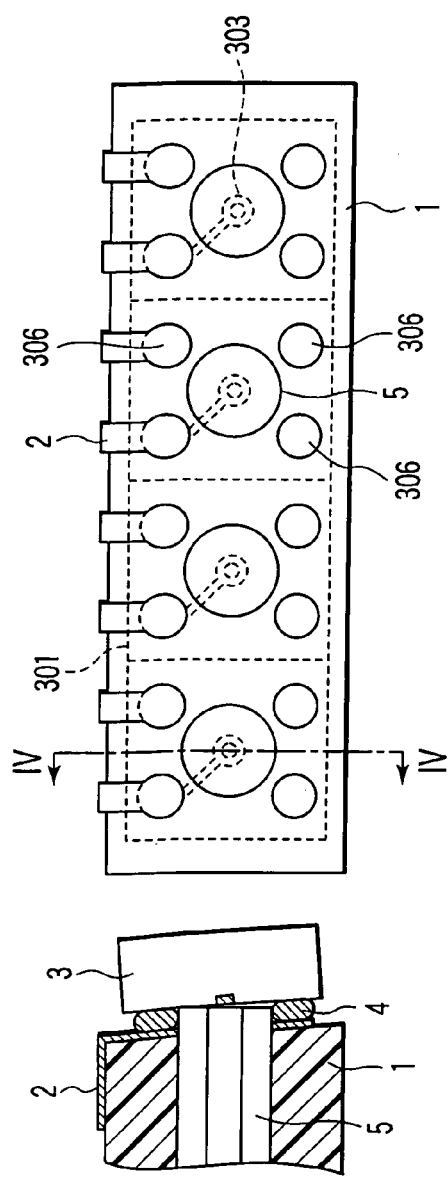
FIG. 9A
FIG. 9B
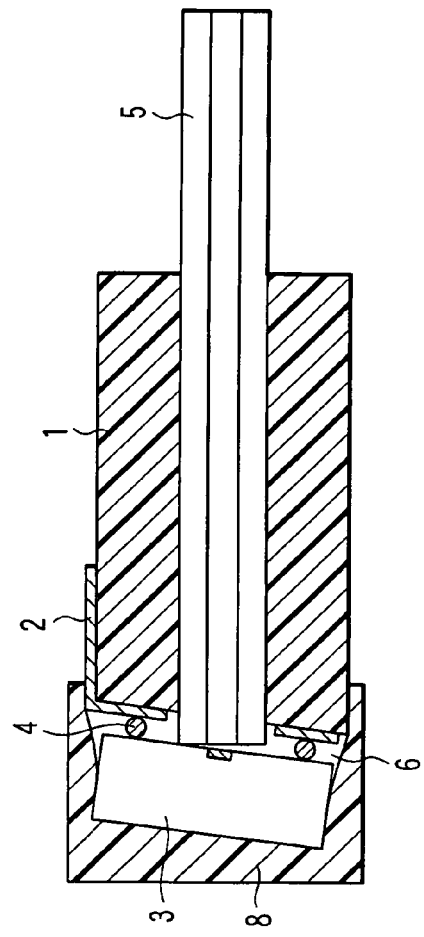
FIG. 10

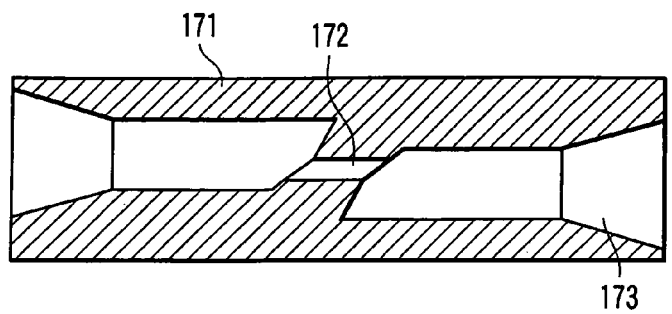
F I G. 25
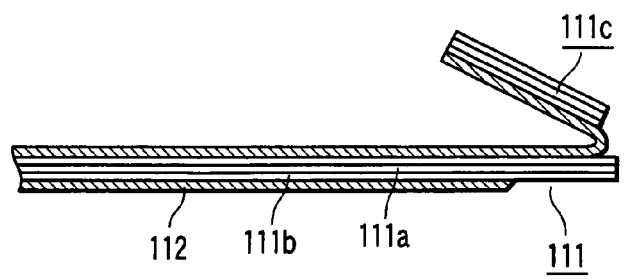
F I G. 26
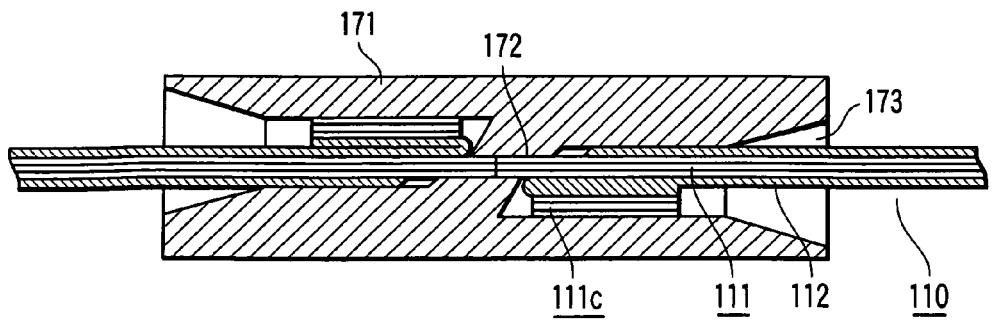
F I G. 27

OPTOELECTRONIC CONVERSION HEADER, LSI PACKAGE WITH INTERFACE MODULE, METHOD OF MANUFACTURING OPTOELECTRONIC CONVERSION HEADER, AND OPTICAL INTERCONNECTION SYSTEM

CROSS-REFERENCE TO RELATED APPLICATIONS

This application is based upon and claims the benefit of priority from prior Japanese Patent Applications No. 2004-237456, filed Aug. 17, 2004; and No. 2005-100312, filed Mar. 31, 2005, the entire contents of both of which are incorporated herein by reference.

BACKGROUND OF THE INVENTION

1. Field of the Invention

The present invention relates to an optoelectronic conversion header applied to a high-speed LSI package and a manufacturing method of the optoelectronic conversion header, an LSI package with an interface module equipped with the optoelectronic conversion header, and an optical interconnection system.

2. Description of the Related Art

Recently, a performance of large-scale integrated circuits (LSIs) is significantly improved to achieve a high speed processing due to an improved performance of electronic devices such as bipolar transistors and field effect transistors. However, even though the processing speed is improved in the LSI, a printed wiring board mounting the LSI is not so sufficiently improved as to have a sufficiently high signal transfer rate or speed for transferring a signal from the high speed processing LSI. The transmission speed in the printed wiring board is restricted due to following reasons. In the printed circuit board, it is necessary to prevent a reduction in a signal quality resulting from an increase in a transmission loss, noise and electromagnetic interference in electric wires due to an increased operation frequency. The longer lines in the circuit board need more restraint on the operation frequency to ensure the satisfactory signal quality. In this background, it is recognized in a common sense that a system speed is limited by a packaging technique rather than the LSI operation speed.

In view of such problems in the electrically wired systems, several optical devices have been proposed in which the LSI is connected via optical waveguides. In the optical waveguide, a signal loss has not frequency dependency even in a range between a direct current and 100 GHz or higher, and noise is not produced due to the electromagnetic interference of wiring paths and a variation in a ground potential. The optical waveguide can readily realize a data transmission capability of several tens of Gbps. An application of the optical waveguide is proposed in Nikkei Electronics, No. 810, pp. 121-122, Dec. 3, 2001, in which an interface module is directly mounted on an interposer for interconnecting the LSI to a peripheral device to transmit a high-speed signal between the LSI and the peripheral device.

In order to realize the optical interconnection disclosed in Nikkei Electronics, No. 810, pp. 121-122, Dec. 3, 2001, the interposer is essentially provided with an optoelectronic conversion component which converts an optical signal into an electric signal or converts the electric signal into the optical signal, and the optoelectronic conversion component is further required to have a small size in order to be arranged in the interposer. This small optoelectronic conversion component has a structure in which a surface emitting laser is optically coupled to an optical fiber, as disclosed in Jpn. Pat. Appln. KOKAI Publication No. 2000-347072. There has been proposed in connection with this structure in Jpn. Pat. Appln. KOKAI Publication No. 2001-281503 which discloses metal projections having different heights or a block having an inclined plane are used to obliquely dispose an optical semiconductor device such as semiconductor lasers to restrain external optical feedback. There has been also proposed in Jpn. Pat. Appln. KOKAI Publication No. 2001-284608 in which a photodiode (PD) of rear surface incidence type is adhesively bonded onto a fiber having an end face obliquely cut with respect to an optical axis.

The conventional structure disclosed in Jpn. Pat. Appln. KOKAI Publication No. 2000-347072 has a problem that if the optical fiber is inserted in a support member provided with the surface emitting laser to optically couple the surface emitting laser to the optical fiber for assembly of the structure, the optical fiber contacts an active area of the optical semiconductor device and this contact easily damage the optical semiconductor device. There is also a problem that since the surface emitting laser is proximately disposed in parallel with the optical fiber, the external feedback light rays are input to the surface emitting laser and easily generate so-called external optical feedback noise.

A conventional structure for suppressing the external optical feedback noise has been disclosed in Jpn. Pat. Appln. KOKAI Publication No. 2001-281503. However, there is a problem in which a temperature change easily varies an inclination angle of the optical semiconductor device in this structure that is provide with the metal projections having different heights or the block having the inclined plane to obliquely dispose the optical semiconductor device. In this structure, if thermal expansion is caused in the metal projections or the block, various changes in heights of the metal projections or the block are produced and the inclination of the optical semiconductor device is changed. In the conventional structure disclosed in Jpn. Pat. Appln. KOKAI Publication No. 2001-281503, the external optical feedback noise is also generated depending on temperature, so that the excessively large inclination angle is set to avoid the external optical feedback noise. Another problem is the excessively low optical coupling efficiency between the surface emitting laser and the optical fiber resulting from the excessive setting of the inclination angle of the optical semiconductor device. Moreover, the conventional structure in Jpn. Pat. Appln. KOKAI Publication No. 2001-281503 is complicated in the structure, and not suitable for mass production.

Furthermore, in the conventional structure disclosed in Jpn. Pat. Appln. KOKAI Publication No. 2001-281503, the entire optical semiconductor device is inclined with respect to the member supporting the optical fiber. The conventional structure has a gap between an end face of the optical fiber and the optical semiconductor device, which has a distance delivered from a multiplication of the inclination angle and a length between an optical semiconductor device end and the active area. Thus, a photo detection area needs to be a small diameter. Especially in a combination of the high-speed photo detector, light rays exiting from the optical fiber are diverged to the high-speed photo detector, leading to a problem that the optical coupling efficiency is easily decreased. The external feedback light rays does not regarded as noise between the photo detector and the optical fiber. However, in such a case as in the inter-LSI wire lying over a relatively short distance of about 1 m at the maximum, most of the external feedback light rays are generated due to a reflection on the optical fiber end face on a photo detector side or a reflection on a photo detector surface and the reflection light rays return to a light emitter via the optical fiber so that the external optical feedback noise is induced. Therefore, measures for prevention of the light reflection are also needed on the photo detector side, and the photo detector needs to be inclined in the conventional structure of Jpn. Pat. Appln. KOKAI Publication No. 2001-281503, resulting in the problem that the optical coupling efficiency is decreased.

Another method to incline the optical semiconductor device is, as in Jpn. Pat. Appln. KOKAI Publication No. 2001-284608, to obliquely form the optical fiber end face together with a ferrule and adhesively bond the optical semiconductor device to this end face. However, this method requires a polishing process to form the end face of the optical fiber into the inclined surface so that it is substantially difficult to significantly reduce costs. In an application of the interconnection between the LSI and the peripheral devices, a permissible cost is low as compared with costs in optical communications or LANs, and there is a problem that a time-consuming process such as the polishing process cannot be permitted.

BRIEF SUMMARY OF THE INVENTION

It is an object of the present invention to provide, at low cost and with high performance, an optoelectronic conversion header, an LSI package with an interface module using the optoelectronic conversion header, and an optical interconnection system which have simple structure and prevent an optical semiconductor device from being damaged during manufacture and assembly while enabling restraint of external optical feedback noise.

According to an aspect of the present invention, there is provided an optoelectronic conversion header comprising:

an optical waveguide which guides an optical signal and has an end face;

a ferrule, having a mounting surface, which holds the optical waveguide in a predetermined position so that the end face of the optical waveguide protrudes from the mounting surface;

an electric wire provided on the mounting surface of the ferrule; and an optoelectronic converter having an optical input/output surface, which is electrically connected to the electric wire and is mounted on the mounting surface of the ferrule, the optical input/output surface being faced to the end face of the optical waveguide so as to transfer the optical signal along a transfer direction between the optical input/output surface and the end face of the optical waveguide, the end face being substantially vertical to the transfer direction, and the optical input/output surface being deviated two degrees or more from a plane vertical to the transfer direction.

According to another aspect of the present invention, there is provided an optoelectronic conversion header comprising:

an optical semiconductor device having an device surface in which a surface light emitter or a surface photo detector is formed;

an optical waveguide having an end face, which guides an optical signal, the optical signal being transferred along a transfer direction between the device surface and the end face;

a ferrule having a mounting surface on which the optical semiconductor device is mounted and a side surface crossing the mounting surface, which holds the optical waveguide so as to face the end face of the optical waveguide to the device surface of the optical semiconductor device at the mounting surface, the end face being substantially vertical to the transfer direction and the device surface being deviated two degrees or more from a plane vertical to the transferred direction; and an electric wire provided on the ferrule, extending from the side surface to the mounting surface and electrically connected to the device surface; and a first transparent resin provided between the end face of the optical waveguide and the device surface of the optical semiconductor device.

According to yet another aspect of the present invention, there is provided an LSI package to be mounted on a printed wiring board comprising:

an interposer equipped with a signal processing LSI and having first electric terminals to be electrically connected to the printed wiring board;

an interface module including an optoelectronic conversion header and an electrical connection terminal, which is electrically and mechanically connectable to the interposer, the optoelectronic conversion header comprising:

an optical waveguide which guides an optical signal and serves as an optical transmission channel for the optical signal and has an end face;

a ferrule, having a mounting surface, which holds the optical waveguide in a predetermined position so that the end face of the optical waveguide protrudes from the mounting surface;

an electric wire provided on the mounting surface of the ferrule; and an optoelectronic converter having a optical input/output surface, which is electrically connected to the electric wire and is mounted on the mounting surface of the ferrule, the optical input/output surface being faced to the end face of the optical waveguide so as to transfer the optical signal along a transfer direction between the optical input/output surface and the end face of the optical waveguide, the end face being substantially vertical to the transfer direction; and the optical input/output surface being deviated two degrees or more from a plane vertical to the transfer direction According to furthermore aspect of the present invention, there is provided an LSI package to be mounted on a printed wiring board comprising:

an interposer equipped with a signal processing LSI and having connecting electric terminals to be electrically connected to a printed wiring board;

an interface module including an optoelectronic conversion header and an electrical connection terminal, which is electrically and mechanically connects to the interposer, the optoelectronic conversion header comprising:

an optical semiconductor device having an device surface in which a surface light emitter or a surface photo detector is formed;

an optical waveguide having an end face, which guides a optical signal and serves as an optical transmission channel for the optical signal, the optical signal being transferred along a transfer direction between the device surface and the end face;

a ferrule having a mounting surface on which the optical semiconductor device is mounted and a side surface crossing the mounting surface, the ferrule holding the optical waveguide so as to face the end face of the optical waveguide to the device surface of the optical semiconductor device at the mounting surface, the end face being substantially vertical to the transfer direction and the device surface being deviated two degrees or more from a plane vertical to the transferred direction; and an electric wire provided on the ferrule, extending from the side surface to the mounting surface and electrically connected to the device surface; and a first transparent resin provided between the end face of the optical waveguide and the device surface of the optical semiconductor device.

According to also furthermore aspect of the present invention there is provided a method of manufacturing an optoelectronic conversion header, the method comprising:

mounting an optical semiconductor device having a rear surface and an device surface in which a surface light emitter or a surface photo detector is formed, on an mounting surface of a ferrule, and electrically connecting the optical semiconductor device to an electric wire on the ferrule, the ferrule having a mounting surface and a insertion hole for holding the optical waveguide;

disposing a stopper member having a surface substantially parallel to the rear surface of the optical semiconductor device on the rear surface; and inserting the optical waveguide into the insertion hole so as to face an end face of the optical waveguide to the device surface of the optical semiconductor device, the end face of the optical waveguide being substantially vertical to a transfer direction of a optical signal guided by the optical waveguide between the end face and the device surface, and the device surface being inclined to a plane vertical to the transferred direction, and putting a transparent resin between the device surface and the end face while the stopper member is disposed on the rear surface of the optical semiconductor device.

According to yet furthermore aspect of the present invention, there is provided an optical interconnection system comprising:

an optical waveguide which guides an optical signal and has first and second end faces optically coupled to each other;

first and second optoelectronic conversion headers optically coupled by the optical waveguide, the first optoelectronic conversion header comprising:

a first ferrule, having a first mounting surface, which holds the optical waveguide in a first predetermined position so that the first end face of the optical waveguide protrudes from the first mounting surface;

an first electric wire provided on the first mounting surface of the first ferrule; and a light emitting device having a light emitting surface, which is electrically connected to the first electric wire and is mounted on the first mounting surface of the first ferrule, the light emitting surface being faced to the first end face of the optical waveguide so as to transfer the optical signal along a first transfer direction from the light emitting surface to the first end face of the optical waveguide, the first end face being substantially vertical to the transfer direction; and the light emitting surface being deviated two degrees or more from a plane vertical to the transfer direction; and the second optoelectronic conversion header comprising:

a second ferrule, having a second mounting surface, which holds the optical waveguide in a second predetermined position so that the second end face of the optical waveguide protrudes from the second mounting surface;

an second electric wire provided on the second mounting surface of the second ferrule; and a photo-detecting device having a photo-detecting surface, which is electrically connected to the second electric wire and is mounted on the second mounting surface of the second ferrule, the photo-detecting surface being faced to the second end face of the optical waveguide so as to transfer the optical signal along a second transfer direction from the second end face of the optical waveguide to the photo-detecting surface, the second end face being substantially vertical to the transfer direction; and the detecting surface being deviated two degrees or more from a plane vertical to the transfer direction.

BRIEF DESCRIPTION OF THE SEVERAL VIEWS OF THE DRAWING

FIGS. 9A and 9B are a plan view and a sectional view schematically showing a four-channel array of the light emitters mounted on the optoelectronic conversion header according to a modification of the second embodiment of the present invention;

FIG. 10 is a sectional view schematically showing the optoelectronic conversion header according to a third embodiment of the present invention;

FIG. 25 is a sectional view schematically showing another optical fiber connector to connect the cut optical fibers;

FIG. 26 is a sectional view schematically showing the cut state of the optical fiber cut in FIGS. 21A and 21B; and FIG. 27 is a sectional view showing a state in which the cut optical fibers as shown in FIG. 26 are connected using the optical connector shown in FIG. 25.

DETAILED DESCRIPTION OF THE INVENTION

There will be described an optoelectronic conversion header, an LSI package with an interface module provided with the optoelectronic conversion header, a method of manufacturing the optoelectronic conversion header, and an optical interconnection system according to embodiments of the present invention, in reference to the drawings.

Figure 1:
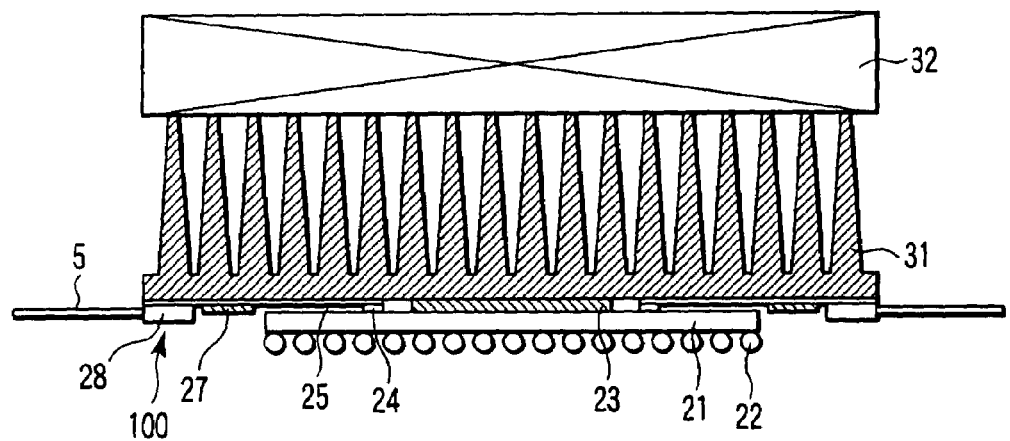
FIG. 1 is a sectional view schematically showing an LSI package with an interface module comprising an optoelectronic conversion header according to a first embodiment of the present invention.

FIG. 1 shows a structure of a LSI package with an interface module comprising the optoelectronic conversion header according to the embodiments of the present invention. This structure of the LSI package with the interface module is described in U.S. application Ser. No. 10/778,030 filed earlier by the present inventors including Hamasaki et al. on Feb. 3, 2004. The entire contents of the U.S. application Ser. No. 10/778,030 are incorporated herein by reference. As the present application is incorporated in the specification of this US Application, the LSI package with the interface module shown in FIG. 1 will be simply described below. This US Application should be referred to for a better understanding of the LSI package with the interface module.

In FIG. 1, solder balls 22 are provided on a lower surface of an interposer substrate 21, and the interposer substrate 21 is fixed to a printed wiring board (not shown) via the solder balls 22. An LSI 23 for signal processing is placed on the interposer substrate 21 which is provided with an electric connection terminal 24. A short length electrical wiring substrate 25 is electrically and mechanically connected to the electric connection terminal 24. On this wiring substrate 25, there are provided a driving IC 27 and an optoelectronic conversion module 28 as an optical semiconductor device driven by the driving IC. An optical fiber 5 is mechanically connected to the optoelectronic conversion module 28, and the optoelectronic conversion module 28 converts an electric signal to an optical signal to be emitted to the optical fiber 5, or the optical signal brought by the optical fiber 5 is converted to the electric signal by the optoelectronic conversion module 28. The electric signal output from the signal processing LSI 23 and processed at a high speed is supplied to the interposer substrate 21, the electric connection terminal 24, the wiring substrate 25 and the optoelectronic conversion module 28 through the driving IC 27 where it is converted to the optical signal to be emitted to the optical fiber 5, while the optical signal brought by the optical fiber 5 is converted to the electric signal by the optoelectronic conversion module 28, and then supplied to the driving IC 27 and the signal processing LSI 23 via the wiring substrate 25, the electric connection terminal 24 and the interposer substrate 21.

A heat sink 31 is mounted on the signal processing LSI 23 and the wiring substrate 25 to cool the signal processing LSI 23 and the wiring substrate 25, and a cooling fan 32 is provided on the heat sink 31 to release heat from the heat sink 31.

As described above, the high-speed signal from the signal processing LSI 23 is supplied not to the mounting board via the solder balls 22 but to the driving IC 27 via the electric connection terminal 24 and the wiring substrate 25. The electric signal is converted to the optical signal by the photoelectric conversion module 28, and then the optical signal is guided to the optical fiber 5. In the package shown in FIG. 1, the interface module including the wiring substrate 25, the driving IC 27, the photoelectric conversion module 28 and the optical fiber 5 is mounted on the interposer substrate 21 equipped with the signal processing LSI 23. That is, the interface module can be mounted on the interposer substrate 21 after the signal processing LSI 23 is mounted on the interposer substrate 21. Further, the heat sink 31 and the cooling fan 32 are mounted on the interface module and the signal processing LSI 23, so that the heat is released from the signal processing LSI 23 via the heat sink 31.

The LSI package with the interface module having such a structure can be mounted on the board in accordance with totally the same procedure and conditions as those under which a current mounting device such as a reflow device is used to mount the LSI on the mounting board manufactured in an existing production line. That is, the interposer substrate 21 equipped with the signal processing LSI 23 is first mounted on the board together with other electronic components using an existing method, and then the interface module is put thereon from the above and fixed with, for example, screws or an adhesive, thereby realizing the structure shown in FIG. 1 on the mounting board.

At that time, production can be carried out without changing the existing mass production line up to a process of mounting the interposer substrate 21 on the board. In a process of manufacturing the optical interconnection module, it is needed to install the interface module but other special operations are not required. Moreover, a process of placing the interface module does not require particularly highly accurate alignment, for example, an alignment with accuracy of ±10 μm, and accuracy for general electric connectors may be sufficient, which does not lead to a notable increase in costs for the mounting process. In other words, by using the available inexpensive printed wiring board such as a glass epoxy substrate and the existing mounting method, it is possible to realize a high-speed board provided with a high-speed signal transmission lines, which is generally difficult to realize with the electrical printed wiring board, for example, having a transmission speed of 20 Gbps per wire.

The LSI package with the interface module described above is an assembly of electrical devices or parts except for the optoelectronic conversion module 28 and the optical fiber 5, and a current semiconductor mounting technique can be applied thereto, thus allowing lower costs by mass production. In the following explanation, an optical semiconductor device subassembly structure to which the optoelectronic conversion module 28 and the optical fiber 5 are optically and mechanically coupled will be referred to as an optoelectronic conversion header 100. If the optical semiconductor device provided in the optoelectronic conversion module 28 is a light emitting type, the optoelectronic conversion header 100 will be referred to as the transmitting-side optoelectronic conversion header 100, and if the optical semiconductor device provided in the optoelectronic conversion module 28 is a photo detecting type, the optoelectronic conversion header 100 will be referred to as the receiving-side optoelectronic conversion header 100.

If the cost required for this optoelectronic conversion header 100 can be reduced, it is possible to decrease the cost for the high-speed wiring board using the optical semiconductor device, which can be a significant contribution to higher capacity and upgrading of information and communication equipment. The optoelectronic conversion header 100 capable of reducing the costs in such an LSI package with the interface module will be described below in greater detail.

There are various factors of increasing a cost in the aforementioned optoelectronic conversion header 100, for example, a defective in assembly of the optoelectronic conversion header 100, in particular, a fault in which the optical semiconductor device is mechanically damaged by an optical waveguide when the optical waveguide such as the optical fiber is placed and fixed or a fault in characteristics that causes external optical feedback noise. The costs of the defective products are added to manufacturing costs of non-defective products, resulting in an increase in cost. It is to be noted that if the optical fiber is obliquely polished as described above, a still larger processing cost is further added to the manufacturing costs. Various embodiments of the optoelectronic conversion header 100 of the present invention capable of reducing the costs will be described below.

First Embodiment

Figure 2:
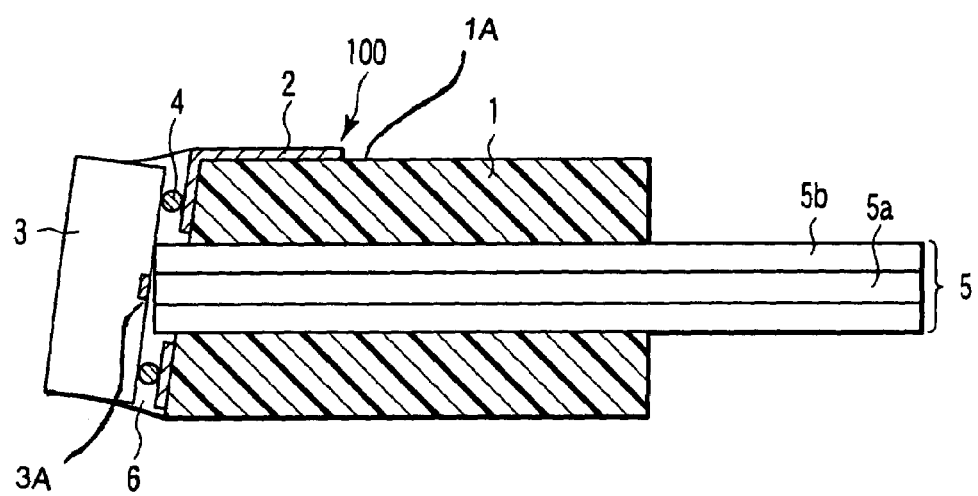
FIG. 2 is a sectional view schematically showing the optoelectronic conversion header at a transmitting end according to the first embodiment of the present invention.

FIG. 2 is a sectional view schematically showing an optoelectronic conversion header 100 at a transmitting side according to a first embodiment of the present invention.

In the optoelectronic conversion header 100 at the transmitting side shown in FIG. 2, an optical fiber 5 is held by a ferrule 1, which serves as an optical waveguide to guide an optical signal. The optical waveguide is not limited to the optical fiber 5, and may be an optical waveguide film. The optoelectronic conversion header 100 in which the optical fiber 5 is held by the ferrule 1 will be described below. The optical fiber 5 is inserted into an insertion hole formed in the ferrule 1, and this ferrule 1 aligns an end face of the optical fiber 5 with a surface light emitter 3 such as a vertical cavity surface emitting laser (VCSEL). Thus, the optical signal guided via a core 5A of the optical fiber 5 is emitted from its end face to a light-emitting portion of the light emitter 3. It is to be noted in FIG. 2 that a numeral 5B indicates a cladding of the optical fiber 5. An optical input/output surface 3A is faced to the end face of the optical fiber 5 so as to transfer the optical signal along a transfer direction between the optical input/output surface 3A and the optical fiber 5.

Furthermore, in the ferrule 1, an electric wire 2, that is, a line electrodes are patterned on an end face and a side surface 1A of the ferrule 1 so that the electric wire 2 is electrically connected to a terminal of the surface light emitter 3 via a mounting bump 4, and the surface light emitter 3 is fixed to the end face of the ferrule 1 by a transparent resin 6 as an under-fill material and an adhesive.

The ferrule 1 is formed in such a manner that epoxy resin in which, for example, glass fillers each having a size of about 30 μm are mixed at about 80% is cast into a die, and the electric wire 2 is formed on this ferrule 1, for example, by pattern metallization utilizing a metal mask and sputtering. Such a manufacturing method allows mass production of the ferrule 1 with the electric wire at very low cost while the ferrule 1 is provided with a very high accuracy of 1 μm or lower. The electric wire 2 is formed to extend from the end face of the ferrule 1 where the surface light emitter 3 is placed to the side surface of the ferrule 1.

Materials that can be used for the ferrule 1 include, in addition to epoxy resin mentioned above, polyphenylene sulfide (PPS), liquid crystal polymer (LCP), polyamide resin, silicone resin, acrylic resin, and a resin in which the glass fillers are mixed into polycarbonate resin. Various materials and connection methods can be used for the optical semiconductor device mounting bump 4, for example, a hot melted type solder bump, a thermal compression bonding type Au bump or a solid state bonding type Sn/Cu bump. For the optical fiber 5, a silica-based multimode graded index (GI) fiber 5 is used such as an optical fiber having a core diameter of 50 μm, a cladding diameter of 125 μm and an NA of 0.21. It is also possible to use, for the optical fiber 5, a multi-component-glass-based optical fiber or a plastic optical fiber.

Here, the end face of the optical fiber 5 is formed to be substantially vertical to a light-guiding direction of the optical fiber 5, and in a case of, for example, the silica fiber, it is slightly scratched by a diamond blade and a lateral pressure is applied thereto to form a stress-broken surface, a so-called cleaved surface. An exclusive cutter is commercially available to form the cleaved surface, so that an optical fiber array, that is, a ribbon fiber can be collectively cleaved in an aligned manner. Further, in a case of, for example, the plastic fiber, an end face forming method including, for example, vertical cutting with a knife or a hot plate molding may be utilized to form the fiber end face. Naturally, when costs are appropriate, the end face of the plastic fiber may be formed by polishing.

The end face of the ferrule 1 where the optical semiconductor device 3 is placed is formed to make an angle with a surface vertical to the light-guiding direction of the optical fiber 5. An inclination angle of this optical semiconductor device mounting face may be set so that the optical fiber does not contact an active portion of the light emitter. An example will be shown below wherein the inclination angle of this mounting face is set.

In the ribbon fiber used in optical communications system in which a large number of silica-based optical fibers are arranged, the respective fibers are generally arranged in an array at a pitch of 250 μm, and, in many cases, the light emitters are also designed to be arranged at a pitch of 250 μm in conformity to the arrangement of the fibers, and the optoelectronic conversion header 100 can be generally designed with ease in this size.

On the other hand, the VCSEL has come into general use as a high-speed surface light emitter 3. The VCSEL signifies a vertically resonant surface emitting laser in general, but in general, it often exclusively signifies a vertically distributed Bragg reflector (DBR) surface emitting laser. In the VCSEL having an oscillation waveband of 850 nm which has become relatively generalized, $Al_xGa_{1-x}As$ is used for a DBR mirror, and in order to obtain a reflectivity of 99.9% or higher required as an oscillating condition, a pair of layers, for example, made of $Al_{0.1}Ga_{0.9}As$ and $Al_{0.9}Ga_{0.1}As$ having a thickness of λ/4 needs to be repeatedly stacked to obtain a thickness of about 3.5 μm. This is required for both a p-side and an n-side with an active layer in between, resulting in a total thickness of 7 to 8 μm.

Furthermore, in the high-speed VCSEL, a selective oxidation structure is often used as a structure to restrict an oscillation area where a current is confined. In the selective oxidation structure, a crystal (e.g., $Al_{0.98}Ga_{0.02}As$) having an extremely strong oxidizing property is thinly provided in the vicinity of the laser active layer, and is selectively oxidized from the outside by a vapor in a manner to leave a desired laser active area. By way of example, crystal layers such as a first DBR layer, an active layer, a selectively oxidized layer and a second DBR layer are sequentially stacked, and they are subjected to mesa etching with a diameter of 30 μm and selectively oxidized from their lateral side edge at a length of 10 μm, whereby the selectively oxidized VCSEL can be produced whose current injection aperture diameter is 10 μm. At this time, the mesa etching may be implemented at a depth to reach the selectively oxidized layer, and reaches a depth deeper than a DBR thickness of 3.5 μm, that is, a depth of about 4 μm.

Taking this selective oxidation structure into consideration, in a VCSEL chip of 250 μm×250 μm, a distance from an edge to a center of the chip is 125 μm, and when a center of a emitting portion is set at a center of the device, a mesa having a height of 4 μm is formed up to 15 μm from the center. As a distance from the chip edge to a mesa edge is 110 μm and the height of the mesa edge is 4 μm, a straight line extending from the chip edge to the mesa edge has an inclination of about two degrees with respect to a chip surface (4 μm/110 μm to tan 2°).

Figure 3:
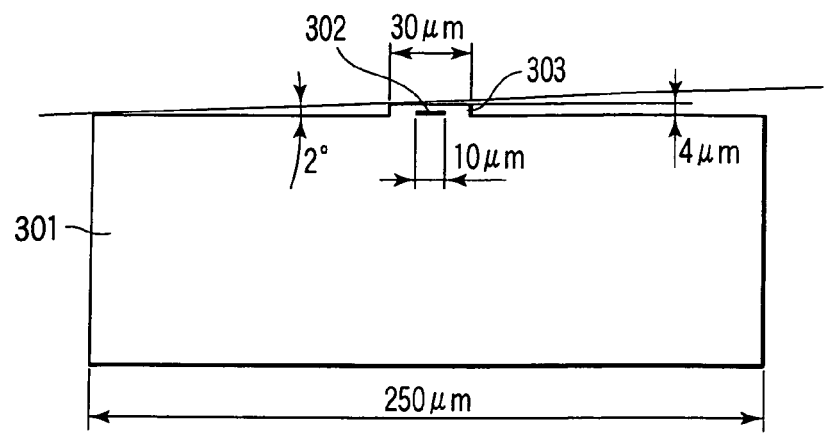
FIG. 3 is a schematic sectional view showing a dimensional example of an optical semiconductor device to explain how the optical semiconductor device shown in FIG. 1 is disposed.

A dimensional relation of the structure is shown in FIG. 3. In FIG. 3, numeral 301 denotes a VCSEL substrate such as a GaAs substrate, numeral 302 denotes a current injection aperture, that is, an active area of the VCSEL formed as a nonselective oxidation area, and numeral 303 denotes a circular mesa as the second DBR layer formed deeper than the selectively oxidized layer.

In FIG. 3, a line drawn from an upper left portion of the VCSEL substrate 301 to an upper left portion of the circular mesa 303 represents a virtual osculating plane, and a contact angle of this plane is about 2°, as described above. In the VCSEL, the device is less likely to be broken even if the end face of the ferrule or the like contacts to a substrate surface such as a mesa-etched surface at a certain degree, unless the optical fiber 5 or the like contacts the circular mesa 303 in which the active area is formed. Thus, in FIG. 2, if a contact angle of an object contacting the plane is 2° or more, the osculating plane contacts the substrate 301, so that the VCSEL active area 302 and/or the circular mesa 303 is/are protected.

Therefore, in the VCSEL having a size of 250 μm×250 μm which corresponds to the array pitch of the general ribbon fiber, an area for the mesa having a diameter of 30 μm which corresponds to the active portion is prevented from contacting the plane having an inclination of two degrees or more, thereby enabling the active portion to be protected. Thus, the end face of the ferrule 1 where the surface light emitter is placed is desirably inclined two degrees or more with respect to the surface vertical to the light-guiding direction of the optical fiber 5.

It is to be noted that this inclination angle is valid for a structure in which the end face of the optical fiber 5 sized more than the chip having a size of 250 μm faces the chip, but if the optical fiber having a diameter smaller than 250 μm faces the chip, a greater inclination angle is required. For example, the general silica-based optical fiber often has a diameter of 125 μm, so that an inclination of about 5 degrees is needed to align with the VCSEL a center of the optical fiber whose diameter is 125 μm in order to protect the active portion of the VCSEL. That is, a distance from the fiber end to the mesa edge is 47.5 μm, thereby satisfying 4 μm/47.5 μm to tan 5°.

Figure 4:
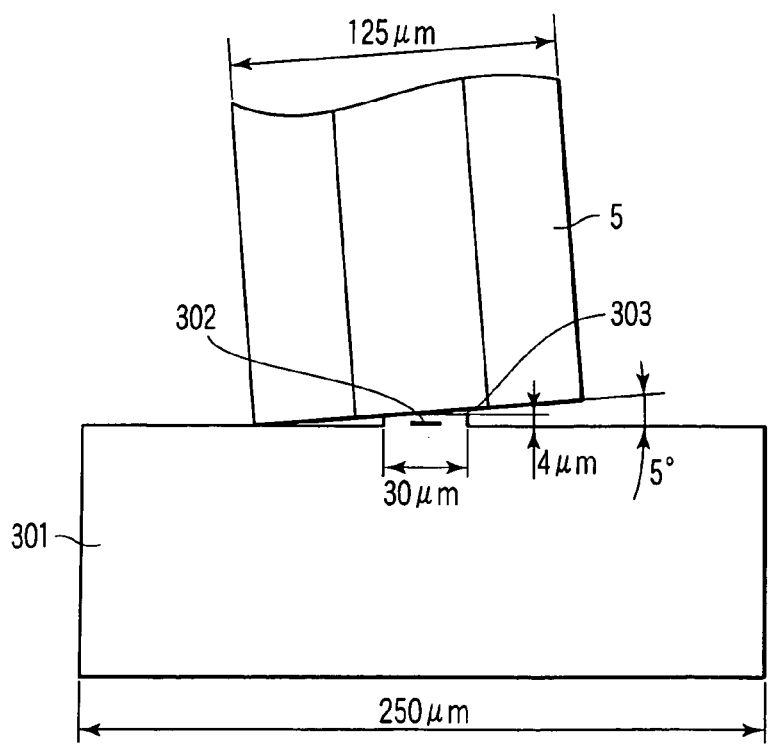
FIG. 4 is a sectional view schematically showing one example of how the optical semiconductor device shown in FIG. 3 and an optical fiber as a light guide are arranged with respect to each other.

The relation described above is shown in FIG. 4. In FIG. 4, numeral 301 denotes the VCSEL substrate such as the GaAs substrate, numeral 302 denotes the current injection aperture, that is, the active area of the VCSEL formed as the nonselective oxidation area, and numeral 303 denotes the circular mesa, that is, the second DBR layer formed deeper than the selectively oxidized layer, dimensions of which are the same as those in the example shown in FIG. 3. Further, numeral 5 denotes the optical fiber which has a diameter of 125 μm as described above. Here, it is assumed that the end face of the optical fiber 5 is vertically cut, and its center (optical axis) is located in the center of the VCSEL active area. In this state, if a condition is obtained under which the optical fiber contacts the surface of the substrate 301 and a corner of the circular mesa 303, the relation is shown in FIG. 4, and a contact angle between the end face of the optical fiber 5 and the VCSEL substrate is nearly 5°.

It is thus easily understood that, as shown in FIG. 4, if the end face of the optical fiber 5 is inclined at 5° or more as described above, the end face of the optical fiber 5 contacts the substrate 301, so that the VCSEL active area 302 and the circular mesa 303 are protected. In addition, this relation is not satisfied if the optical fiber 5 and the VCSEL 3 are arranged without being brought into alignment with each other to cause a misalignment of their centers, but as understood from the structure shown in FIG. 2, this results from a problem in alignment when the VCSEL 3 is mounted to the ferrule 1. For accuracy in this alignment, there is a method in which the optical fiber holding hole is aligned by use of image recognition thereof to allow an accuracy of ±5 μm or lower. With further consideration of this alignment accuracy, if the inclination angle of the optical fiber, that is, the inclination angle of the optical semiconductor device mounting face of the ferrule 1 is 5.5°, the optical fiber does not contact the VCSEL active portion.

In this way, the optical semiconductor device mounting face of the ferrule is inclined taking into account unevenness of a surface of the VCSEL, which can provide a configuration wherein the optical fiber does not contact the active portion of the light emitter. Naturally, this embodiment is based on the assumption that a thickness of bump metals or the like on which the optical semiconductor device is mounted is substantially even within the surface and that there is substantially no change in a relative angle between the optical fiber and the VCSEL even if a temperature changes.

Furthermore, it is known that the oblique coupling of the optical fiber 5 to the light emitter 3 also provides an effect of restricting an occurrence of noise due to external feedback light. However, a distance from a light output surface of the light emitter (VCSEL) 3 to the light input end surface of the optical fiber 5 can be about 2 µm which is extremely short. Therefore, although the optical fiber and the VCSEL are inclined, reflected light rays from the optical fiber end face may be coupled to an optical resonance mode of the VCSEL 3 to produce the external optical feedback noise.

To alleviate this problem, the reflected light rays from a place very close to the end face of the optical fiber 5, particularly the reflected light rays whose optical path are located within a range of several µm may be reduced to a low level, and a difference in refractive indices may be made as small as possible between the optical fiber (refractive index of about 1.46) and its surroundings (refractive index of 1 in a case of air). To narrow the difference in refractive indices, it is effective to put a transparent material having a refractive index close to that of the optical fiber 5 into a gap between the optical fiber 5 and the light emitter (VCSEL) 3, which makes it possible to obtain an effect similar to that when the optical fiber 5 is distanced from the light emitter 3 in an equivalent manner due to a decrease in reflectivity caused by the narrowed refractive index difference. When the transparent resin 6 is placed as shown in FIG. 2, the refractive index difference can be reduced. Thus, it is desirable that a refractive index of the transparent resin 6 be equal to or substantially equal to the equivalent refractive index of the optical fiber.

Furthermore, use of the transparent resin 6 also provides an effect of restraining weak vibration of the optical fiber 5 due to external force. The optical fiber 5 contacts various objects outside the optoelectronic conversion header 100, and act as a vibration transmitting medium which transmits the external force from these objects to the inside. If the optical fiber is subjected to external periodic vibration and this vibration is located in the vicinity of a mechanical resonant vibration frequency, this might cause internal resonant vibration in which an end of the optical fiber 5 or the optical semiconductor device 3 contacting the same weakly vibrates. The placing of the transparent resin 6 described above is also effective in preventing and attenuating such internal vibration.

Moreover, the transparent resin 6 also has an effect of lessening a difference in thermal expansion characteristics between the optical semiconductor device 3 and the ferrule 1. The transparent resin 6 also provides an advantage that stress or distortion due to the difference in their thermal expansion coefficients does not concentrate on a connection between the optical semiconductor device 3 and the ferrule 1, that is, a periphery of the mounting bump 4, and this stress or distortion is dispersed over the optical semiconductor device 3 and the entire mounting surface opposite thereto.

Thus, the use of the transparent resin 6 is also advantageous in preventing degradation of a heat cycle and further increases its effect, so that it is also effective to mix, into the transparent resin 6, a transparent fine grain filler such as silica or crushed quartz having a mean particle diameter of several µm to several tens of µm. That is, a mixing rate of the transparent fine grain filler is adjusted so that the average or equivalent thermal expansion characteristics of the resin conform to those of the optical fiber and the optical semiconductor device or are defined as their intermediate value, thereby allowing an increase in a thermal stress (thermal strain) relieving effect.

Figure 5:
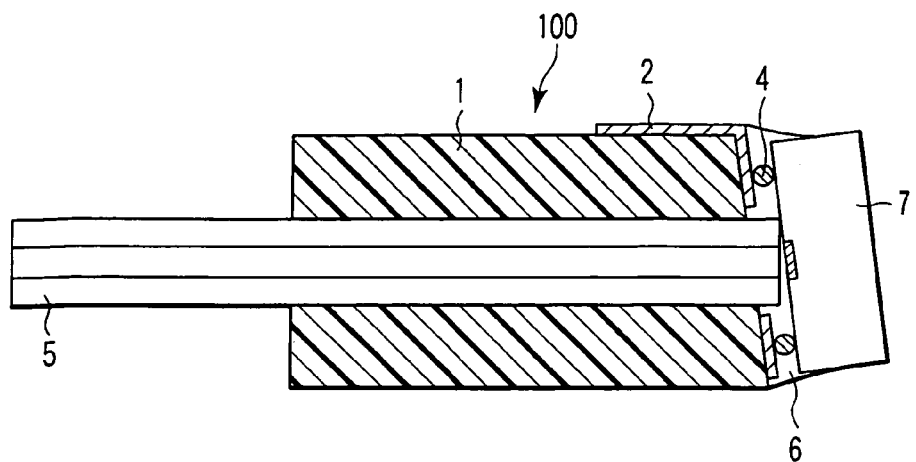
FIG. 5 is a sectional view schematically showing the optoelectronic conversion header at a receiving end according to the first embodiment of the present invention.

FIG. 5 is a sectional view schematically showing the optoelectronic conversion header 100 at a receiving end according to the first embodiment of the present invention, and shows a configuration in which the optical fiber 5 faces a photo detector 7 instead of the light emitter shown in FIG. 1.

In FIG. 5, a numeral 1 denotes the ferrule which holds and positions the optical waveguide such as the optical fiber or the light guide film. The optical fiber 5 will be described below as an example of the optical waveguide. Further, a numeral 2 denotes the electric wire or the extraction electrode patterned on the ferrule 1; a numeral 4 denotes the optical semiconductor device mounting bump; a numeral 5 denotes the optical fiber; a numeral 6 denotes the transparent resin as the optical semiconductor device under-fill material and the optical fiber adhesive; and a numeral 7 denotes a planar photo detector or a PIN photo diode (PIN-PD).

The ferrule 1 can be made of epoxy resin described above, and materials other than epoxy resin can also be used. Further, the materials that have already been described can be used for the bump 4 to mount the optical semiconductor device 7 and for the optical fiber 5. The end face of the optical fiber 5 is formed to be substantially vertical to the light-guiding direction of the optical fiber 5 as in the structure shown in FIG. 3, and the method of forming this surface is as described earlier.

The end face of the ferrule 1 mounting the optical semiconductor device 7 is inclined at a small angle with respect to the surface vertical to the light-guiding direction (optical axis) of the optical fiber 5. In general, the photo detector 7 often has a planar structure, that is, a structure whose surface is flat, and the end face of the optical fiber is not a completely vertical surface and is vertical in an irregular manner, but the inclination angle of the optical fiber can be set to an optional value if it is more than a range of irregularity in the verticality. However, the same ferrule as the ferrule holding the light emitter shown in FIG. 3 can also be used for the ferrule 1 to be provided with the photo detector 7, and if the inclination angle of the mounting surface is set at 2° or more or at 5° or more when the optical fiber 5 is proximate thereto, the ferrule 1 can be used in common for the light emitter and the photo detector.

Furthermore, to restrain reflection at the receiving end, that is, reflection on the end face of the optical fiber 5 or on a surface of the photo detector 7, it is effective to place the transparent material having the refractive index close to that of the optical fiber 5 into a gap between the optical fiber 5 and the photo detector (PIN-PD) 7. This restrains reflection dependent on a refractive index difference at an output terminal of the optical fiber 5 between the optical fiber 5 and the outside thereof, and it is desirable that the refractive index of the transparent resin 6 be equal to or substantially equal to the equivalent refractive index of the optical fiber 5. In addition, if light rays reflected the receiving end is brought into the optical fiber 5, this reflected light rays will reach the transmitting side to enter the light emitter 3 at the transmitting side, thus producing noise at the transmitting side. Therefore, the reflected light also needs to be restrained at the receiving end.

Furthermore, use of the transparent resin 6 also provides the effect of restraining the weak vibration of the optical fiber 5 due to the external force as described above, and is also effective in preventing and attenuating the above-mentioned internal vibration. Moreover, the transparent resin 6 also has the effect of lessening the difference in thermal expansion characteristics between the optical semiconductor device 7 and the ferrule 1, and is also advantageous in preventing the degradation of the heat cycle as described above. In order to further enhance these effects, it is also advantageous to mix into the transparent resin 6 the transparent fine grain filler such as silica or crushed quartz having a mean particle diameter of several μm to several tens of μm.

It is to be noted that when the optical semiconductor device is the surface light emitter 3, the active area corresponds to the emitting portion which emits light by current injection and an area surrounding the same. The active area generally signifies an area extending outward from the emitting portion over 10 to 20 μm, or a mesa area which has been processed so that the emitting portion is separated from the periphery thereof. Further, in the photo detector, the active area corresponds to a portion (light-receiving portion) of a depletion layer extending from a pn-junction or a metal semiconductor junction to apply an electric field to a light-absorption layer, and to an area surrounding the same. The active area generally signifies an area extending outward from the light-receiving portion over 10 to 20 μm, or a mesa area which has been processed so that the light-receiving portion is separated from the periphery thereof.

As described above, in the structure in which the end face of the optical fiber is disposed proximately to the photo detector 7 and inclined with respect to the surface vertical to the optical axis, a distance between the optical fiber 5 and the photo detector 7 can be very short, so that expansion of an optical beam after being emitted from the optical fiber can be minimized. That is, a light-receiving diameter of a light-receiving area in the photo detector can be set slightly greater than a core diameter of the optical fiber to prevent a decrease in optical coupling efficiency, which is also effective in restraining modal noise in multimode optical fiber transmission. For example, 10 μm can be added to the core diameter of the optical fiber (60 μmφ in a case of the optical fiber whose core is 50 μmφ) so that the light-receiving diameter is slightly greater than the core diameter of the optical fiber.

The optoelectronic conversion header 100 at the light-transmitting end on which the light emitter 3 is mounted shown in FIG. 2 and the optoelectronic conversion header 100 at the light-receiving end on which the photo detector 7 is mounted shown in FIG. 5 are effective in decreasing costs for the optical interface module and restraining the external optical feedback noise. In an optical fiber having a relatively short distance, for example, a length of 1 m or shorter, not only the optical signal guided through the optical waveguide core 5A but also a non-guided light (cladding mode) propagating through the cladding 5B of the optical waveguide might be transmitted to the light emitter 3 at the transmitting end. That is, an amount of light reaching the light emitter 3 is not fixed due to the optical coupling efficiency between the light emitter 3 and the optical waveguide core 5A, so that uncertain and easily varying light might be transmitted to the light emitter 3. However, by using both the optoelectronic conversion header 100 at the light-transmitting end on which the light emitter 3 is mounted shown in FIG. 2 and the optoelectronic conversion header 100 at the light-receiving end on which the photo detector 7 is mounted shown in FIG. 4, the external optical feedback noise can be effectively restrained. More specifically, there is a problem that the restraint of the reflected light at the light-transmitting end makes it easy for light with a large angle which will be the cladding mode to be introduced into the optical waveguide, and that without reflection restraint at the receiving end, the random reflected light due to the cladding mode will return to prevent stabilization of an operation of the VCSEL. However, as described above, by using both the optoelectronic conversion header 100 at the light-transmitting end on which the light emitter 3 is mounted, shown in FIG. 2, and the optoelectronic conversion header 100 at the light-receiving end on which the photo detector 7 is mounted, shown in FIG. 5, the stable operation can be performed even in the optical interconnection system having a relatively short distance, for example, a wire length of 1 m or shorter.

As apparent from the above description, fields to which the present invention can be applied include a form wherein there is one optical waveguide 5, and one end of the optical waveguide 5 is provided in the optoelectronic conversion header 100 at the light-transmitting end on which the light emitter is mounted, shown in FIG. 2, while the other end of the optical waveguide 5 is provided in the optoelectronic conversion header 100 at the light-receiving end on which the photo detector is mounted, shown in FIG. 5. It is also apparent that the fields to which the present invention can be applied also include a form wherein different optical waveguides are optically coupled to an optical connector (not shown) by the optoelectronic conversion header 100 at the light-transmitting end on which the light emitter is mounted and by the optoelectronic conversion header 100 at the light-receiving end on which the receiving device is mounted.

It is to be noted that the above-mentioned inclination angle of the optical fiber, that is, a maximum angle at which the surface of the ferrule 1 to mount the optical semiconductor device is inclined with respect to a vertical surface may be set as follows.

In the optoelectronic conversion header 100, a maximum light-receiving angle of the optical fiber 5 is defined as an upper limit of setting the optical fiber inclination angle. That is, an angle more than that exceeds a maximum waveguide mode angle of the optical fiber, so that light in a direction of a main axis (normal) of the VCSEL cannot be coupled. Thus, since the optical coupling efficiency unnecessarily decreases beyond that angle, drawbacks will be greater. The maximum light-receiving angle of the optical fiber 5 is about 12° (half angle value), in a case of the aforementioned silica-based multimode graded index (GI) fiber (having a core diameter of 50 μm, a cladding diameter of 125 μm and an NA of 0.21).

The half angle mentioned here is a half of a light-receiving full angle of the optical fiber (angle combining all positive components and negative components of angular deviation from the main axis direction), and represents a value of maximum permissible angular deviation from the main axis direction. It is also possible to use the multi-compound-glass-based optical fiber or the plastic optical fiber for the optical fiber 5, in which case it can have a still greater light-receiving angle (NA).

Next, in the optoelectronic conversion header 100 at the transmitting end, an optical coupling limitation between the optical fiber and the VCSEL includes an angle in which the maximum light-receiving angle of the optical fiber is combined with a light emission angle of the VCSEL. At an angle more than the above-mentioned optical fiber maximum light-receiving angle, light having an angle in the main axis direction of the VCSEL cannot be optically coupled, but a light component at a bottom part produced by an expanding angle of the light output from the VCSEL can be coupled, so that a physical limit will be an angle at which this coupled light substantially disappears. For example, the output light emission angle of the VCSEL is about 8° in signal mode oscillation (full width at half maximum: FWHM) and about 20° in higher-order transverse mode oscillation (full width at half maximum: FWHM).

Thus, a value in which each half angle is added to the maximum light-receiving angle of the optical fiber will be the substantial limit of the optical coupling, and this value may be the inclination angle of the optical fiber in the embodiment of the present invention described above, that is, a maximum inclination angle of the surface of the ferrule 1 on which the optical semiconductor device is mounted. In the optical fiber described above, a maximum setting angle is 16° in the signal mode oscillation VCSEL (sum of an optical fiber maximum light-receiving angle of 12° and a half angle at half maximum of the VCSEL output light of 4°), or 22° in the higher-order transverse mode oscillation VCSEL (sum of an optical fiber maximum light-receiving angle of 12° and a half angle at half maximum of the VCSEL output light of 10°), and there is little point in setting an angle more than these angles.

Figure 6:
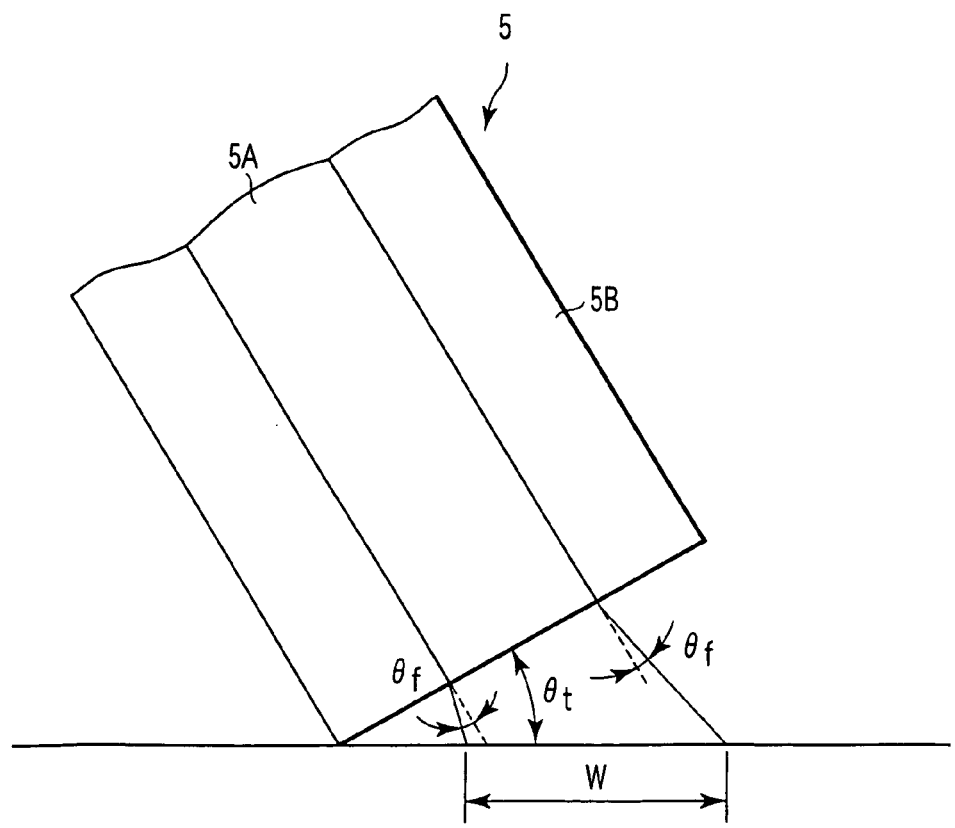
FIG. 6 is a sectional view schematically showing one example of how the optical semiconductor device in the optoelectronic conversion header shown in FIG. 5 and the optical fiber as the light guide are arranged with respect to each other.

Furthermore, in the optoelectronic conversion header 100 at the receiving end shown in FIG. 6, when the optical fiber 5 has a diameter of 125 μm, a core diameter of 50 μm and a fiber NA of 0.21 (light-receiving (emission) angle: θf=12°), a light irradiation area width W with respect to an inclination angle θt will be as follows: W=50 μm when θt=0°, W=60 μm when θt=16°, W=70 μm when θt=25°, and W=80 μm when θt=32°. At 10 Gbps where the optical interconnection is more advantageous than the electric wire in a general printed wiring board FR-4 (UL standard), if the light-receiving area diameter of the receiving device exceeds 80 μm, there will be difficulty in operation due to a limit of a CR product of parasitic capacitance thereof and an impedance of 50 Ω in a general transmission line. That is, in an operation at 10 Gbps where the optical wire is effective, the light-receiving area diameter of the receiving device needs to be limited to 80 μm or lower, and θt needs to be 32° at the maximum.

Thus, in the optoelectronic conversion header 100 of the present embodiment, since the ferrule 1 holding the optical waveguide 5 such as the optical fiber and the optical semiconductor device 3, 7 are mounted by use of the bumps 4 having nearly equal height, the inclination angle of the optical semiconductor device 3, 7 does not vary with a temperature change. Moreover, because its mounting surface is adapted to have a normal deviated from an optical axis direction of the optical waveguide 5, a gap is automatically formed which corresponds to a sectional width and deviation angle of the optical waveguide 5, thereby making it possible to essentially prevent a problem that the optical semiconductor device active portion contacts and damages the optical waveguide 5. This can provide a setting where the active portion of the optical semiconductor device is not damaged even if the optical waveguide 5 is brought in proximity to the optical semiconductor device 3, 7 to the extent immediately before they contact or to the extent that they contact, so that the optical waveguide 5 can be brought into proximity to the optical semiconductor device active portion up to several μm with satisfactory repeatability.

Consequently, even if the light-receiving diameter of the receiving device 7 is reduced to the core diameter of the optical waveguide to achieve a higher speed, highly efficient optical coupling can be implemented without using any additional article such as a lens which leads to a cost increase.

In this structure, since the optical semiconductor device 3, 7 is inclined with respect to the optical waveguide 5, the external optical feedback noise can naturally be restrained, and in particular, the transparent resin 6 is put to restrain the reflection at an interface of the optical waveguide, so that even if the optical waveguide 5 is brought into proximity to the optical semiconductor device 3, 7 at several μm, a distance effect surpasses an inclination effect to restrain the production of the external optical feedback noise. Further, the light input/output ends of the optical waveguide 5 (such as the optical fiber and the light guide film) to exert the effects described above may be a vertical end face, and requires no costly oblique processing such as oblique polishing. Moreover, extreme accuracy is not needed for the light input/output ends of the optical waveguide 5 in order to put the transparent resin 6 on the vertical end face, and a so-called cleaved end face is applicable. The present embodiment thus has an advantage that it is substantially free of trouble in terms of processing costs. From such reasons, the high-speed LSI inter-chip wiring can be realized at low cost, which can be a significant contribution to the upgrading of information and communication equipment.

Second Embodiment

Figures 7A, 7B:
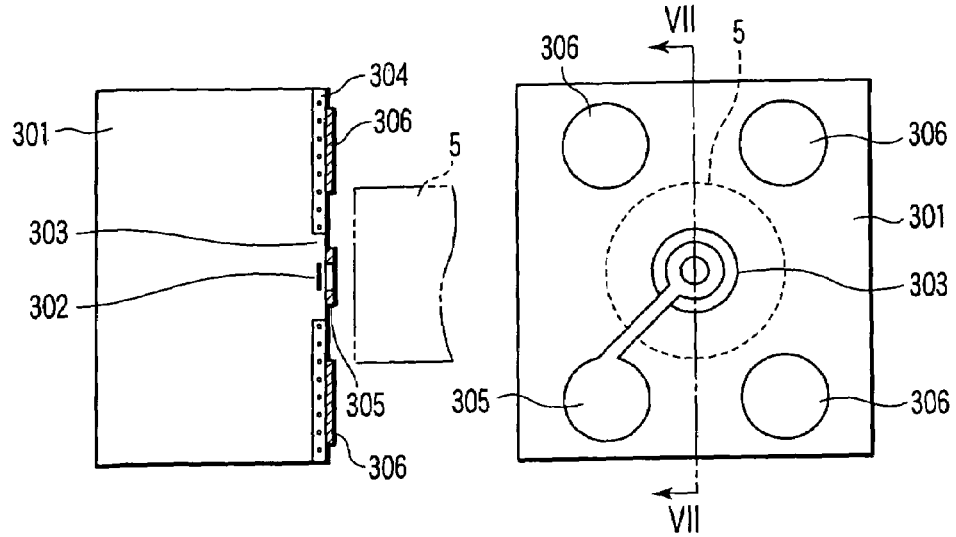
FIGS. 7A and 7B are a plan view and a sectional view schematically showing a light emitter mounted on the optoelectronic conversion header at the transmitting end according to a second embodiment of the present invention.
Figures 8A, 8B:
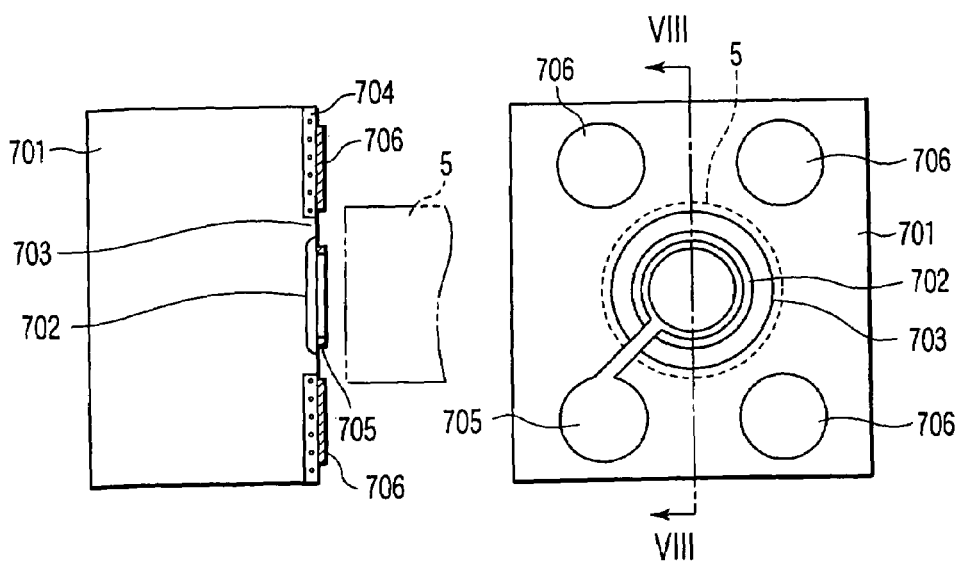
FIGS. 8A and 8B are a plan view and a sectional view schematically showing a photo detector mounted on the optoelectronic conversion header at the receiving end according to the second embodiment of the present invention.

FIG. 7A is a plan view schematically showing a light emitter as an optical semiconductor device mounted on an optoelectronic conversion header 100 at a transmitting end according to a second embodiment of the present invention, and FIG. 7B is a sectional view along the VII-VII line shown in FIG. 7A. FIG. 8A is a also plan view schematically showing a photo detector as an optical semiconductor device mounted on the optoelectronic conversion header 100 at a receiving end according to the second embodiment of the present invention, and FIG. 8B is a sectional view along the VIII-VIII line shown in FIG. 8A. A structure of the optical semiconductor device itself may be of a mesa type such as that of the VCSEL described above, but a type of device with low electrode capacitance is shown here by way of example for the purpose of high-speed operation.

In FIG. 7A and FIG. 7B, a numeral 301 denotes a semiconductor substrate, a numeral 302 denotes a laser oscillation area where a laser wave oscillates, a numeral 303 denotes a circular mesa, a numeral 304 denotes an insulating film, a numeral 305 denotes an active area electrode, and 306 denotes a ground electrode. In FIG. 8A and FIG. 8B, a numeral 701 denotes a semiconductor substrate, a numeral 702 denotes an inverse impurity diffused area (light-receiving portion of pn-junction), a numeral 703 denotes a circular mesa, a numeral 704 denotes an insulating film, a numeral 705 denotes an active area electrode, and a numeral 706 denotes a ground electrode. In FIG. 7B and FIG. 8B, an optical fiber 5 disposed opposite to the light emitter and the photo detector is indicated by a virtual line. An insulating film 304, 704 is an insulator having a thickness that reduces a parasitic capacitance of the electrode for high-speed operation of the device, and for example, a polyimide film having a thickness of 4 μm is used for this. This thickness is equivalent to the above-described depth of mesa etching of a VCSEL, and corresponds to refill of a mesa etching area for selective oxidation.

Furthermore, if an array of the photo detectors (PIN-PD) is formed, holes are diffused due to a carrier density gradient when minority carriers and a non-diffused area are of an n type, and the mesa etching is thus implemented to form a minority carrier diffusion prevention cavity for prevention of arrival at adjacent devices. In a PIN structure using a direct transition type semiconductor material, it is often the case that a depth of the impurity diffused area is about 1 μm and a thickness of a light absorption layer is 2 to 3 μm, and the minority carrier diffusion prevention cavity may be formed to have a depth of about 4 μm. This minority carrier diffusion prevention cavity portion is refilled with a mesa etching area in the same manner as the VCSEL, thereby providing a thick-film insulator to reduce the capacity of the electrode.

Here, the active portion electrodes 305, 307 are the only parts needed to reduce electrode capacitance by use of the thick-film insulator, but all the bumps preferably have an equal structure and size in accordance with the spirit of the present invention, so that the ground electrode 306, 706 has the same configuration as that of the active portion electrode. Thus, the entire device has a substantially flat surface, and this makes a difference and provides a different function as compared with a case where a wiring pattern is connected (not shown) to the active portion or connected to the substrate through the thick-film insulator, but a mechanical configuration of a bump 4 as an electrode pad is not changed.

In this configuration, it is desirable that the electrodes 305 and 306 or 705 and 706 be not formed except in an inclination direction of the surface of the ferrule 1 on which the optical semiconductor device is mounted shown in FIG. 2, that is, the electrodes and the wires be not formed in a direction in which the optical semiconductor device is inclined when viewed from the optical semiconductor device active portion. The reason for this will be described referring to FIGS. 9A and 9B.

FIGS. 9A and 9B are diagrams schematically showing a configuration in an example similar to that of the optoelectronic conversion header 100 shown in FIG. 2, in which example a four-channel array of the light emitters shown in FIGS. 7A and 7B is mounted as the optical semiconductor device. FIG. 9A is a top view from an optical semiconductor device mounting surface of the ferrule 1, and FIG. 9B is a sectional view along the IX-IX line shown in FIG. 9A.

As understood from FIG. 9B, in this embodiment, the light emitter 3 itself is obliquely disposed along a vertical direction of the drawing, and regarding the optical fiber 5 with a vertical end face, an edge of the optical fiber 5 is in contact with a vertical direction of the light emitter 3, that is, a line along the IX-IX line on an outer peripheral side of the active area. It will be appreciated that such a manner of contact generates force by mechanical contact between the optical fiber 5 and the light emitter 3, which might cause destruction or scratch of the on-chip electrical wiring metal of the light emitter. Thus, it is preferable not to dispose an electrode at this contact portion. For this reason, in the optical semiconductor device shown in FIGS. 9A and 9B, the electrodes 305, 306 are disposed in the diagonal direction of the optical semiconductor device.

Third Embodiment

FIG. 10 is a sectional view schematically showing an optoelectronic conversion header 100 according to a third embodiment of the present invention. It is to be noted that the same numerals are assigned to the same parts as those in FIG. 2, and these are not described in detail.

A structure shown in FIG. 10 is built in such a manner that a light absorbing resin 8 is additionally provided in the structure shown in FIG. 2. A light absorbing resin 8 includes, for example, carbon fine particles, a pigment material, or epoxy resin, acrylic resin or silicone resin into which germanium fine particles are mixed, and is formed into a shape as shown in FIG. 10 by, for example, a resin mold. In this connection, it is preferable that the light absorbing resin 8 be provided to have a thickness which makes it sufficiently opaque for a wavelength used, for example, a thickness of 0.5 mm when a wavelength is 850 nm and the resin contains the Ge particles at 20%, and the light absorbing resin 8 be formed to totally cover the outside of a transparent resin 6, but it may not cover some parts such as a part where a electrode is drawn. This light absorbing resin 8 functions effectively in restraining external optical feedback noise as described above.

The transparent resin 6 placed to restrain the external optical feedback noise has an effect of restraining the reflection on the optical fiber end face, but cannot always achieve perfect correspondence of refractive indices, so that there is often a slight amount of residual reflection. Light components produced by this residual reflection are often scattered and diffused around and lost when their medium is air, but in this case, the transparent resin 6 has a refractive index higher than that of the ambient air and thus reflects a significant number of light components inward at an outer peripheral interface with the air. That is, there is a problem that the transparent resin 6 serves as a material to confine light and prevents rapid scattering of the residual reflected light components, that is, the unnecessary light components. As a result, the residual reflected light components are confined to become a light returning to the VCSEL, and it increases a level of background noise of the VCSEL. This increase in the noise causes an increase of jitter when very fast optical transmission is performed, which is less than preferable. Moreover, in the optoelectronic conversion header 100 at a light-receiving end, the transparent resin 6 closes a place where the light reflected on the surface of the photo detector should be rapidly scattered and lost, and this light will travel back to the optical fiber and reach a light emitter side.

To solve a problem of light confinement in the structure in which the transparent resin 6 is used, the light absorbing resin 8 is provided at a part corresponding to the interface between the transparent resin 6 and the air. A material whose refractive index is equal to that of the transparent resin 6 can be used for the light absorbing resin 8. In brief, it is possible to use the transparent resin 6 into which the light absorbing material is mixed. Even if the light absorbing resin 8 and the transparent resin 6 do not have the same refractive index, resin materials generally easily achieve a refractive index of about 1.4 to 1.6, so that a combination of materials is readily created which has a very small difference in refractive indices. Thus, in the structure shown in FIG. 10, almost no reflected light components are present at a boundary of the transparent resin 6 and those components are rapidly absorbed into the light absorbing resin 8.

In the light absorbing resin 8, light absorbers therein absorb residual reflected light, thereby restraining the light returning to the light emitter 3. At this time, the light expands all over within the transparent resin 6, so that even if the light absorbing resin 8 is removed in some parts of the transparent resin 6, for example, in about 10% of the surface thereof, the reflected light in those parts is rapidly eliminated by other light absorbing resin contact portions, and the light is not substantially stuffed inside. Therefore, it is of no importance that some parts are not provided with the light absorbing resin 8 as described above. This holds true with a case where the light absorbing resin is not provided at portions corresponding to the electrodes, for example, to create a recognition mark checking window used during packaging.

It is to be noted that there is also an effective manner to form a second transparent resin (not shown) similar to the transparent resin 6 at a part corresponding to the light absorbing resin 8, instead of providing the above-mentioned light absorbing resin 8. According to this method, the boundary of the transparent resin 6 located in the vicinity of an exit of a gap between the optical semiconductor device and the ferrule is extended to a farther position, so that the external feedback light reflected at the resin boundary does not easily travel back to the gap between the optical semiconductor device and the ferrule by spatial diffusion. This is practically not a problem if the second transparent resin is provided to have a thickness more than a length from the optical axis of the optical fiber to an end of the optical semiconductor device.

Figure 11:
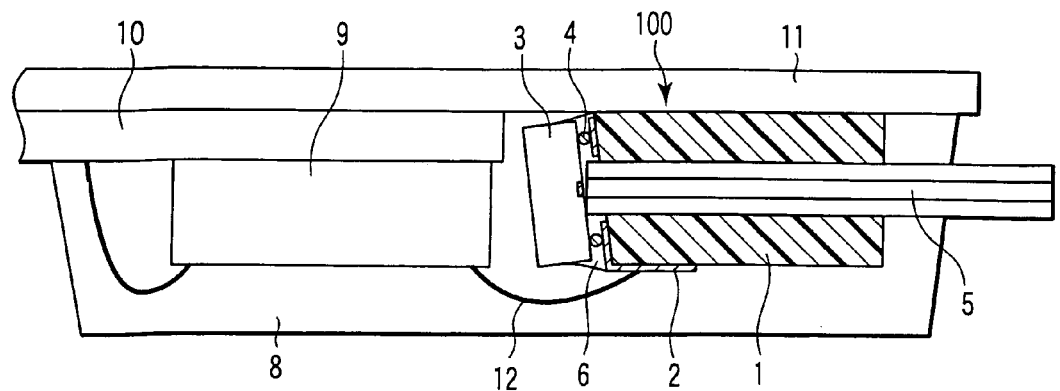
FIG. 11 is a sectional view schematically showing the optical interface module comprising a driver IC and the optoelectronic conversion header shown in FIG. 10.

The above-mentioned structure shown in FIG. 10 can be modified as shown in FIG. 11. In FIG. 11, while numerals 1 to 6 indicate the same parts or components as those shown in FIG. 10, a numeral 8 denotes the light absorbing resin covering the entire optoelectronic conversion header 100, a numeral 9 denotes an optical semiconductor device driving IC (such as a driver or receiver), a numeral 10 denotes a wiring substrate, a numeral 11 denotes a mounting substrate also serving as a heat sink, and a numeral 12 denotes a bond wire.

FIG. 11 is shows an embodiment in which the optoelectronic conversion header 100 shown in FIG. 2 or 5 is applied to a LSI package with an interface module shown in FIG. 1, and in this example, after the optoelectronic conversion header 100, the optical semiconductor device driving IC and the like are mounted and electrically connected by the bond wire and the like, a protective molded resin is provided at a part corresponding to the interface module. The light absorbing resin 8 and the second transparent resin described above can be used as the protective molded resin, and it is needless to mention that its effect includes the restraint of the above-mentioned external optical feedback noise.

Fourth Embodiment

Figure 12:
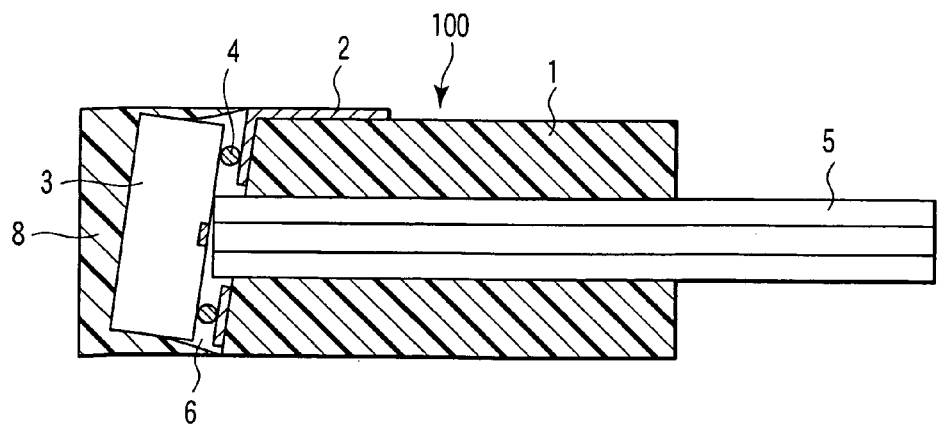
FIG. 12 is a sectional view schematically showing the optoelectronic conversion header according to a fourth embodiment of the present invention.

FIG. 12 is a sectional view schematically showing an optoelectronic conversion header 100 according to a fourth embodiment of the present invention. It is to be noted that the same numerals are assigned to the same parts as those in FIG. 10, and these are not described in detail.

A structure shown in FIG. 12 is different from the structure shown in FIG. 10 in that an outer shape of a light absorbing resin 8 in FIG. 10 is formed to extend from a ferrule 1 and that the optoelectronic conversion header 100 is seemingly formed as a rectangular parallelepiped chip.

In such a configuration, handling is easy because the optical semiconductor device is not exposed, and there is less limitation in packaging. For example, even if the optoelectronic conversion header 100 is exposed to a flux or a molten solder, it does not directly contact the optical semiconductor device and is therefore not easily affected. Further, a light absorbing resin portion is prevented from overflow of the resin, so that even if an electrode extraction portion is brought in close proximity to the mounting substrate, there is a little chance that other components contact the mounting substrate before the electrode contacts the mounting substrate. Thus, in this embodiment, a flip chip type packaging method as shown in FIG. 13 can be applied.

Figure 13:
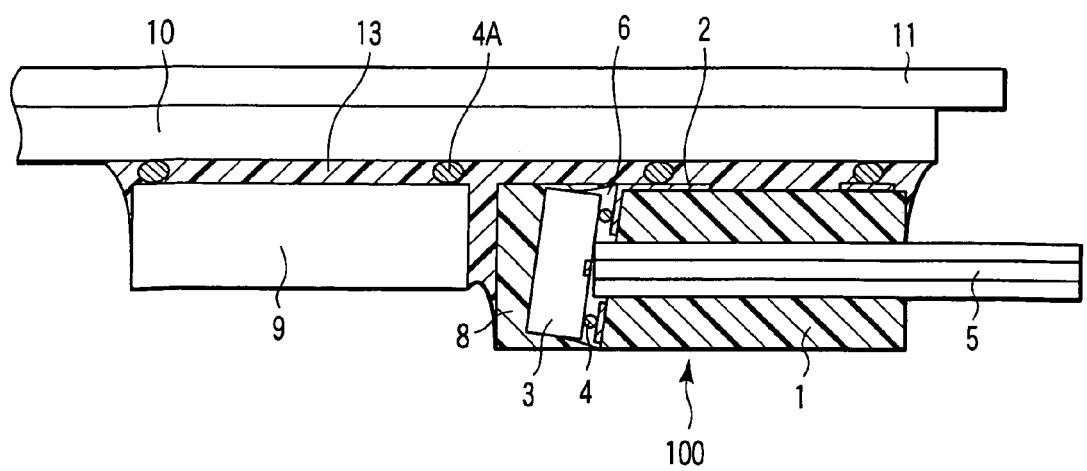
FIG. 13 is a sectional view schematically showing the optical interface module comprising a driver IC and the optoelectronic conversion header shown in FIG. 12.

In FIG. 13, electric wires (not shown) to connect the respective devices are formed on a wiring substrate 10. In FIG. 13, a numeral 13 denotes an underfill material on a flip chip mounting surface of the optical semiconductor device driving IC and the optoelectronic conversion header 100, and 4A denotes a connection bump. Such a manner of mounting makes it possible to shorten a wire from the optical semiconductor device driving IC to the optoelectronic conversion header 100 and is effective in improving high-speed operation characteristics.

Fifth Embodiment

Figure 14A:
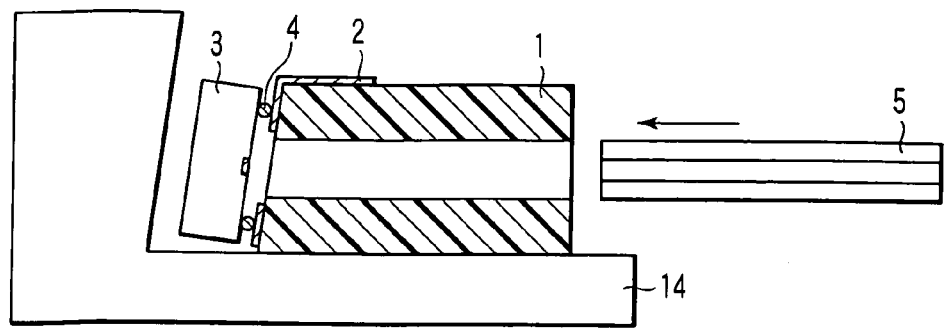
FIGS. 14A, 14B and 14C are sectional views schematically showing a process of manufacturing the optoelectronic conversion header according to a fifth embodiment of the present invention.
Figure 14B:
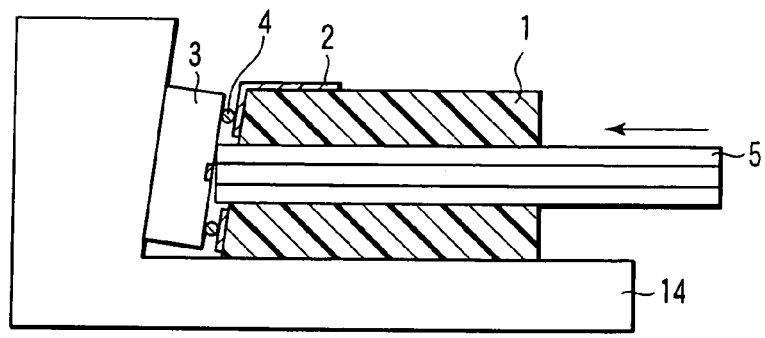
Figure 14C:
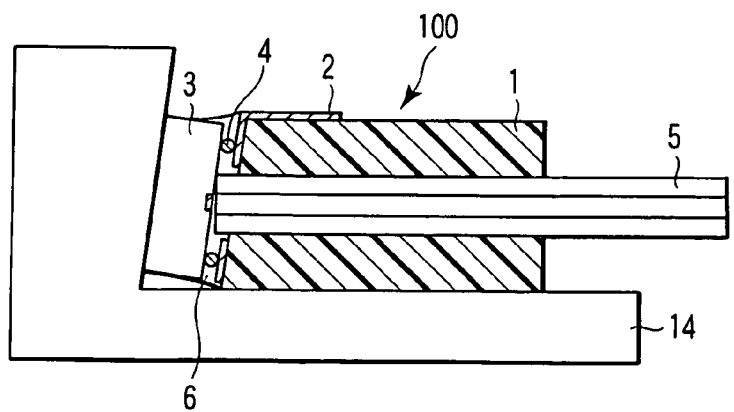

FIGS. 14A, 14B and 14C are sectional views schematically showing a process of manufacturing an optoelectronic conversion header 100 according to a fifth embodiment of the present invention. It is to be noted that the same numerals are assigned to the same parts as those in FIG. 2, and these are not described in detail.

In the process of manufacturing the optoelectronic conversion header 100 according to this embodiment, a light emitter 3 is first mounted on a ferrule 1 having an electrode 2 and an inclined optical semiconductor device mounting surface. This process is implemented in such a manner that the active area pattern of the optical semiconductor device is mechanically aligned by image recognition with a guide hole for an optical fiber and an electrode pattern of the ferrule. In this process, an accuracy of a mounting position is controlled, for example, within ±2 μm. For example, thermal compression bonding of Au stud bumps is used to connect an optical semiconductor device to the electrode 2.

Next, as shown in FIG. 14A, this ferrule is set to a jig 14 comprising, on its rear side, a stopper as a fixing wall which has the same inclination angle as that of a surface of the ferrule 1 where the optical semiconductor device is mounted. In this process, the ferrule 1 and the jig 14 are not fixed, and a guide groove or the like is provided in the jig 14 so that the ferrule 1 can slide on the jig 14 only in a direction of the optical fiber guide hole. A material and configuration are considered for the guide groove of the jig 14 so that a friction against the ferrule 1 is reduced. For example, fluorocarbon resin may be disposed at a contact portion.

Next, as shown in FIG. 14B, an optical fiber 5 is inserted into the ferrule 1. At this time, a transparent resin, that is, an adhesive 6 to fix the optical fiber may be first applied in a liquid state to decrease the friction when the optical fiber is inserted. The optical fiber 5 is inserted by use of a device such as a micrometer with a depression sensor which makes it possible to monitor pressure to insert the optical fiber. Then, at a point where the insertion pressure has reached a predetermined pressure during the insertion of the optical fiber or at a starting point of the insertion pressure obtained by a differential between the insertion pressure and an insertion distance, the insertion of the optical fiber 5 is stopped. The pressure at which the insertion of the optical fiber is stopped may be set at a pressure value which is lower than a pressure at which an edge of the optical fiber is broken and which does not cause cracks or the like of an optical semiconductor device substrate.

Finally, as shown in FIG. 14C, the transparent resin 6 is solidified. A thermosetting resin or an ultraviolet curing resin is used for the transparent resin 6, and when the optical fiber 5 reaches a predetermined insertion position, a curing treatment such as heating or ultraviolet irradiation may be carried out.

The use of such a manufacturing method can preclude excessive external force from being applied to a connection of the optical semiconductor device and the ferrule, that is, a bump electrode 4, and significantly reduce faulty mounting of the optical semiconductor device, for example, dropping of the electrode. Parts which undergo the most external force during the insertion of the optical fiber include the optical fiber and the optical semiconductor device substrate in the vicinity of a portion contacting the optical fiber, whereas the bump electrode 4 is only subjected to force by the friction between the ferrule 1 and the jig 14. As described above, this can be reduced by devising a way to reduce the friction in the jig 14 so that the friction between the ferrule 1 and the jig 14 is reduced. For example, the jig 14 is vertically stood to set the ferrule 1 from above, whereby the friction between the ferrule 1 and the jig 14 can be substantially brought to zero.

According to the optoelectronic conversion header 100 and the LSI package with the interface module of the present invention, the high-speed LSI inter-chip wiring can be realized at low cost, which can be a significant contribution to the upgrading of the information and communication equipment.

There is a case where the optical fiber 5 of the LSI package described above is connected to another optical fiber or a case where the optical fiber 5 is provided with an optical connector, and in order to connect such optical fibers or to manufacture such an optical connector, it is preferable to cut/shape the end face of the optical fiber according to an optical fiber end face shaping method described below. Further, when this shaping method is implemented, a cover remover which will also be described below is used to remove a cover of the optical fiber, and when the optical fibers shaped in this shaping method are connected, it is preferable to use an optical fiber connector described below.

It is to be noted that in the optical fiber end face shaping method described below, for example, its end face processing or connecting operation can be simplified, and this method can therefore be applied not only to the end face processing for the optical fiber 5 of the LSI package but also to other technical fields such as optical communications in which the optical fibers are used.

In general, the end face processing, that is, shaping/cutting of the optical fiber is implemented to connect the optical fibers or to install the optical fiber in the optical connector, and it is thus necessary to smoothen a cut surface so that a great amount of optical loss is not caused in the cut surface of the optical fiber.

In a known optical fiber end face processing method, after the cover of the optical fiber is removed, a small slash is caused to an optical fiber by a cutting blade, and this portion is bent so that mirror surface breakage is caused to the optical fiber by use of brittle fracture of glass. There is also a method in which the optical fiber is bent together with the cover, and the cover is broken by putting the cutting blade thereon, and then a small slash is caused to the optical fiber from the broken portion by the cutting blade to accomplish the mirror surface breakage.

However, in the method in which the cover is removed to shape the optical fiber end face, because the optical fibers are cut in a state separable from each other, fragments, that is, chips of the optical fibers tend to be scattered. The scattered fragments are highly likely to stick in a skin of, for example, a hand or foot, and in a worst case, they are carried through blood vessels by bloodstream to reach a heart or brain, which can place a life at risk.

Furthermore, in the method in which the optical fiber is shaped together with the cover, it is possible to significantly reduce the scattering of the fragments of the optical fiber, but there is a problem that a yield ratio of cutting the optical fiber is extremely reduced due to a thickness distribution of a cover material.

According to the optical fiber end face shaping method described below, a person who handles the optical fiber is not placed at risk, and yet it is possible to obtain characteristics comparable with those in a case where the optical fiber is only cut.

Figure 15:
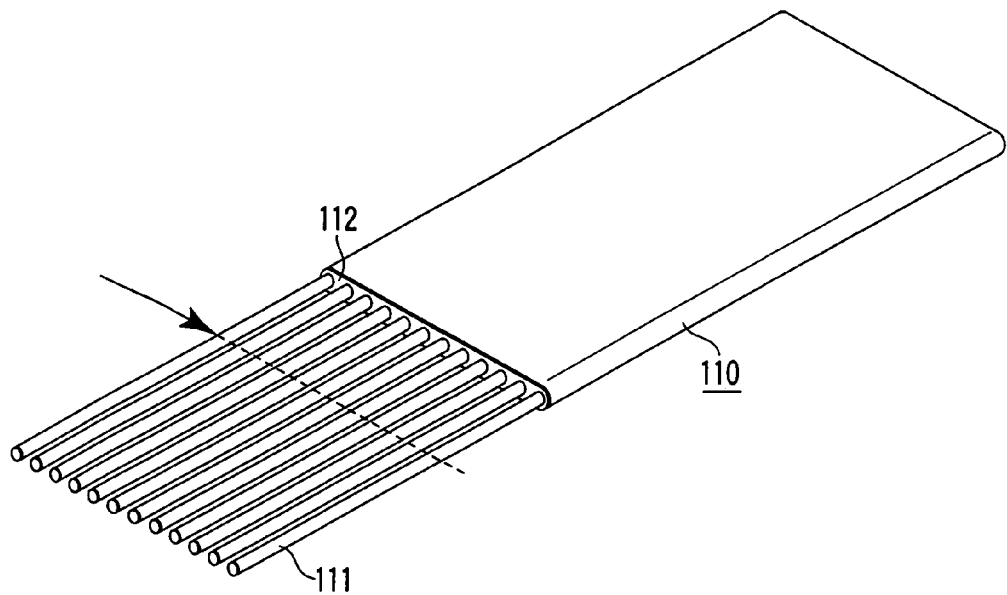
FIG. 15 is a perspective view schematically showing a ribbon optical fiber to explain a method of shaping an end face of the optical fiber provided in the LSI package as a referential example.

FIG. 15 is a perspective view schematically showing a ribbon optical fiber to explain a method of shaping the end face of the optical fiber as a first referential example, wherein 110 denotes a optical fiber ribbon, 111 denotes an optical fiber, and 112 denotes a cover resin of the optical fiber 111. In the method as the first referential example, after a tip of the cover resin 112 has previously removed, or in a state where the optical fibers 111 are displaced from the cover resin 112 so that the optical fibers 111 are separated from each other to make it possible to pull the optical fibers from the cover resin 112, the optical fibers 111 are cut, for example, at a portion indicated by an arrow in FIG. 15. This causes a problem that fragments, that is, chips of the optical fibers 111 tend to be scattered, and the scattered fragments are highly likely to stick in the skin of, for example, the hand or foot.

The optical fibers generally used in the optical communications are often made of a material such as quartz or multi-component glass, and they are transparent and very thin, for example, with an outside diameter of about 125 μm, and are thus difficult to visually recognize, which poses a problem that once they are scattered, it is substantially difficult to collect them. Moreover, they are very hard and thin, so that the fragments thereof easily break into the skin, and if those fragments enter the blood vessels, they can be carried through the blood vessels by the bloodstream and reach the heart or brain, which might place a life at risk.

Such a risk is relatively known to optical fiber engineers, and attention is paid in handling the optical fiber fragments. However, the optical fibers have come into use in fields other than the optical communications, for example, in the optically wired device described above, and there is a higher risk of directly touching the fragments of the optical fibers without knowing the danger of the optical fiber fragments, for example, as if scraps of electric wires were handled.

Figures 16A, 16B:
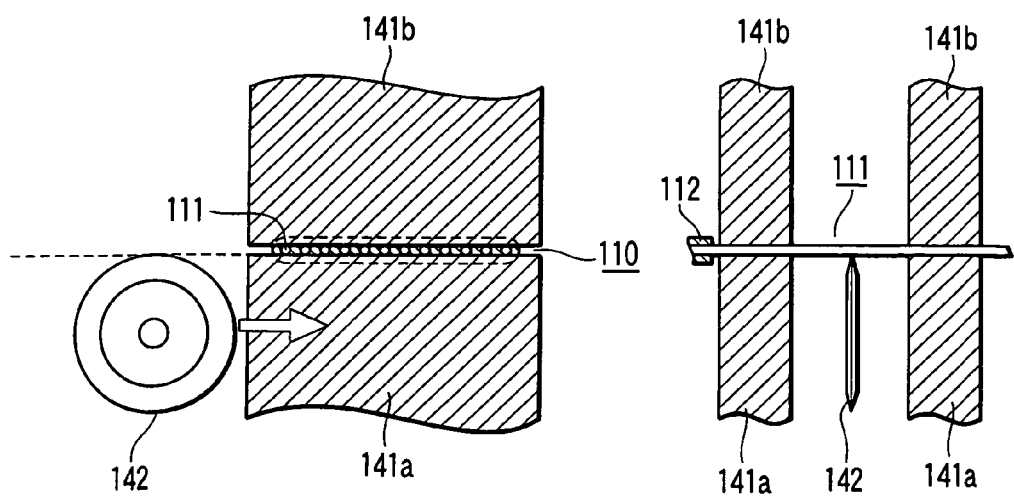
FIGS. 16A and 16B are sectional views schematically showing a cutting device according to a method of cutting the optical fiber shown in FIG. 15 as a first referential example.

Furthermore, when the optical fiber is actually cut, the optical fibers 111 are held so that they are vertically sandwiched between two cramp portions 141a, 141b, for example, as shown in FIGS. 16A and 16B, and a cemented carbide blade 42 is moved between them in a manner to slightly scrape the optical fiber as shown in FIG. 16B, thereby causing a small slash thereto. Then, stress is applied so that a side on which the cemented carbide blade 42 has scraped will be convex (outside), thereby causing mirror surface breakage to the optical fibers 111. FIG. 16A shows a section orthogonal to a longitudinal direction of the optical fiber, and FIG. 16B shows a section parallel to the longitudinal direction of the optical fiber. After the optical fiber has been cut, when the cramp portions are opened, for example, the cramp portion 141b is moved upward to finish end face shaping, the fragments or chips of the optical fibers are scattered around.

An optical fiber cutter has been developed which is provided with a mechanism to collect the chips, but there still remains a problem of how to dispose of the fragments of the optical fibers. There is also a problem of safety when the fiber has been unsuccessfully cut to produce the crushed fragments of the optical fibers. For example, it is necessary to clean the cramp portions 141a, 141b of the optical fiber cutter when the crushed fragments or the like of the optical fibers have been produced, but the chip collecting mechanism does not function to deal with the broken pieces or crushed fragments at that instance. As a matter of fact, there is a high risk of inadvertently shaking off the crushed fragments in the cramp portions with bare hands, which is in fact far from an essential resolution.

Figures 17A, 17B:
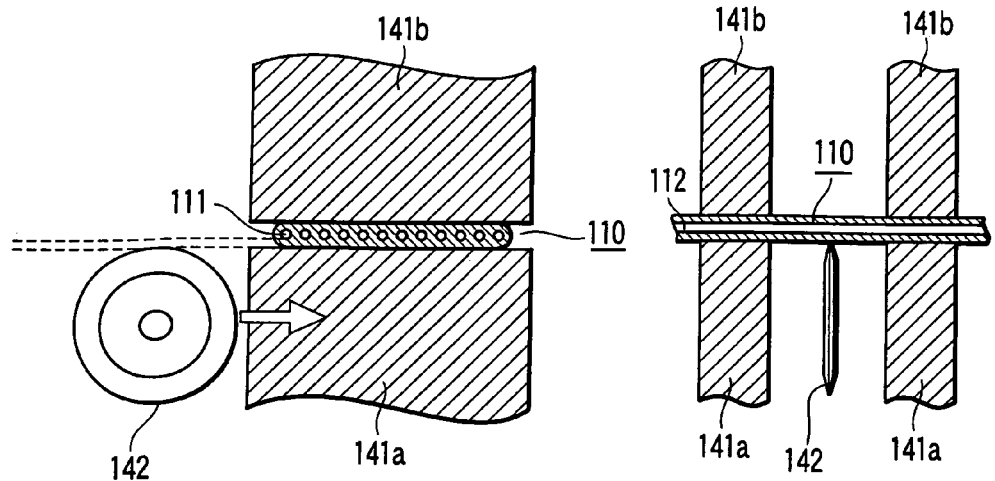
FIGS. 17A and 17B are sectional views schematically showing the cutting device according to the method of cutting the optical fiber shown in FIG. 15 as a second referential example.

FIG. 17A is a sectional view showing a method of cutting the optical fiber with the optical fiber cutter while the cover resin 112 is left. In the method shown in FIG. 17A, the cemented carbide blade 142 needs to contact the optical fibers 111, for which purpose two ways can be conceived: one way to cause a slash to the optical fibers 111 while cutting up the cover resin 112; and one way to implement cutting of the cover resin 112 separately from cutting of the optical fibers 111. However, both of the ways use a surface of the cover resin 112 as a basis, and it is not ensured that the cemented carbide blade 142 contact the optical fibers 111 unless it is possible to guarantee an accuracy, for example, an error of 1 μm or less in a thickness of the cover resin 112. More specifically, the cemented carbide blade 142 moves into the ribbon optical fiber ribbon 110 as indicated by broken lines in FIG. 17A, and contacts the optical fibers 111 at an erratic distance.

In general, a relatively elastic resin is used for the cover resin 112 of the optical fiber, such as acrylic resin or silicone resin. Thus, a slight change in thickness is caused due to holding pressure of the cramp portions, and a thickness change is further caused by thermal expansion due to an ambient temperature during operation. Further, a finished thickness, among others, changes depending on variations in a process during coating, on a cover resin structure and on whether the cover resin is single-layered or multi-layered, so that there is little hope that a stable thickness is constantly provided. This might result in a reduction in the yield ratio of cutting the optical fiber due to the variations in thickness of the cover resin 112.

Next, a detailed description will be given to the optical fiber end face shaping method, the cover remover and the optical fiber connector which solves the problems described above.

Figure 18:
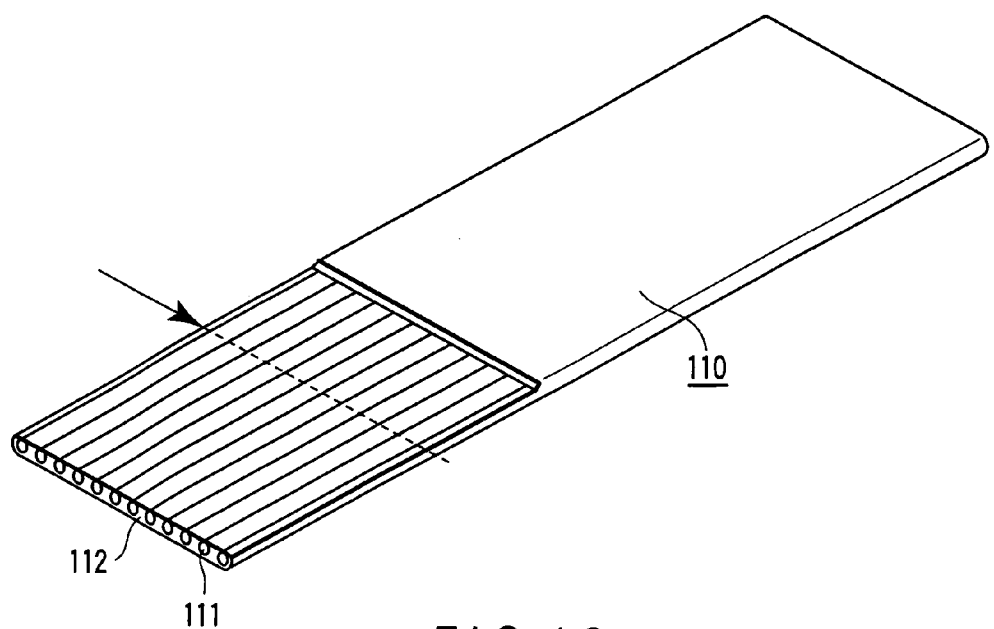
FIG. 18 is a perspective view schematically showing the ribbon optical fiber to explain the optical fiber end face shaping method.

FIG. 18 is a perspective view showing a schematic configuration of the optical fiber to explain the optical fiber end face shaping method.

In FIG. 18, a numeral 110 denotes the optical fiber ribbon, a numeral 111 denotes the optical fiber, and a numeral 112 denotes the cover resin. The optical fiber 111 and the cover resin 112 are generically called the optical fiber ribbon 110. Here, the optical fiber ribbon 110 is shown as a so-called ribbon fiber in which a plurality of optical fibers 111 is arrayed, but this optical fiber may have a single core. Moreover, the optical fiber 111 generally has a coaxial structure in which a cylindrical light guiding core is surrounded with a light confining clad, but it is shown without an internal structure in FIG. 18 to FIG. 21.

In FIG. 18, the optical fiber 111 is, for example, a silica-based optical fiber having an outside diameter of about 125 μm, and the cover resin 112 is, for example, an acrylic UV (ultraviolet) cured resin, and a combined thickness of the optical fiber and the cover resin is, for example, about 300 μm. The cover resin 112 may simply cover the optical fibers as shown in FIG. 18, but may also have a double structure which separately covers the respective optical fibers and entirely covers the bound optical fibers.

First, the tip of the optical fiber ribbon 110 is folded together with the cover resin 112 and roughly broken, thereby making the tip roughly uniform. Here, the chips as the fragments of the roughly broken optical fibers 110 are enclosed by the relatively soft cover resin 112, and they do not stick in the skin unless they are force to do so. Further, for the cover resin 112, the transparent resin is used which is easy to visually recognize, and it is thus easy to visually recognize the fragments. Therefore, the fragments produced by the rough breakage may be clipped by a general adhesive tape or sealed in a glass bottle or the like and then discarded in the same manner as glass waste, which is not particularly highly dangerous. Further, in the rough breaking operation, if the tips of the optical fiber ribbon 110 are not arranged in an extremely disorderly manner, a process of roughly making the tip uniform is not particularly required, and may normally be omitted.

Next, the cover resin 112 is partially removed as shown in FIG. 18. For this purpose, a plane blade (not shown) such as a razor made of carbon steel for cutting tools is obliquely put toward the tip of the optical fiber ribbon 110 in such a manner that an angle between the optical fiber ribbon 110 and the plane blade is, for example, 30 to 45°, and the plane blade can only be slid to shave a side surface of the optical fibers 111, thereby partially removing the cover resin 112. In order to partially remove the cover resin 112, the plane blade is made of a material harder than the cover resin 112 and softer than the optical fiber 111, so that the surface of the optical fiber 111 will automatically serves as a guide to remove the cover resin, whereby a proper amount of cover resin 112 is only removed to always leave a reproducible shape.

Furthermore, the optical fiber ribbon 110 is damaged if the plane blade is extremely strongly pressed on the optical fiber ribbon 110, so that it is necessary to properly adjust pressing force. For example, in a case of a ribbon optical fiber having 12 cores (covered with an acrylic UV cured resin) which is a general silica-based optical fiber, the cover resin 112 can be removed with a force of about 2 to 3 N if the razor made of carbon steel for cutting tools is used, and the pressing force may be about 5 N at the maximum.

When the cover resin 112 is removed in the method described above, a layer of the cover resin 112 on one side of the optical fibers 111 is removed as shown in FIG. 18, and if a section where the cover has actually been removed is checked in detail, it has been found out from an experiment by the present inventors that the cover resin 112 is removed as far as a portion between the optical fibers 111 which is slightly set back from a side of the optical fiber 111. This seems to be due to the fact that when the cover resin 112 is shaved off by the plane blade, a portion where the cover resin has not been removed in the vicinity of a tip of the plane blade is mechanically pulled up, and the cover resin 112 is thus cut in a state extended outward beyond a side top portion of the optical fiber 111. This phenomenon is beneficial in a next process of shaping/cutting the optical fiber.

Next, the optical fiber 111 is shaped/cut, that is, cleaved or stress-broken. In this shaping/cutting, a cutting blade (not shown) made of diamond or a cemented carbide alloy (e.g., WC using Co as a binder) is first rubbed against the surface of the optical fiber 111 along a broken line portion in FIG. 18, thereby forming a small slash (initial slash). Then, bending stress is applied in such a manner that a side where the small slash is formed will be on the outside (convex portion). Instead of forming the small slash by the cutting blade, it is possible to use a method in which pulse heating is performed by a thin line heater to apply local stress or a method in which ultrasonic waves are applied.

Here, in forming the small slash on the surface of the optical fiber 111, it is difficult to determine a distance between the cutting blade and the optical fiber surface due to a thickness distribution of the cover resin 112 in the example shown in FIGS. 17A and 17B described above. Contrarily, in this first shaping method, a most convex portion on a side to which the cutting blade is put is on the surface of the optical fiber 111, the small slash or the like can be caused in a highly reproducible manner. It is thus understood that, in causing the small slash, this shaping method is characterized in that it can bring results substantially equivalent to that in a method in which the optical fiber 111 is totally exposed to cause the small slash.

Furthermore, when the cover resin 112 is removed in this shaping method, an outermost portion of the optical fiber 111 and the cover resin 112 are arranged in the same plane where the small slash or the like is caused, and it is thus possible that the cover resin 112 interferes with the causing of the small slash by the cutting blade. However, as described above, the outermost portion of the optical fiber 111 actually slightly protrudes from the cover resin 112, and the small slash can be caused without trouble.

As a result, the optical fiber 111 is shaped or cut in the broken line area in FIG. 18, and the end face can be formed into a mirror surface, but the cut fragments of the optical fibers 111, that is, tip-side portions from the broken line in FIG. 18 remain held by the cover resin 112. That is, a state in FIG. 18 is seemingly maintained before and after the shaping/cutting, and it looks as if slight bending is caused at a shaped/cut portion (broken line portion in FIG. 18) toward a side where the cover resin 112 is not removed. Thus, the fragments are not scattered even if the optical fiber end face is cut, and this effect is provided because an interface between the cover resin 112 and the optical fiber 111 is not taken off and because the optical fiber 111 is cut in a state where the majority of the cover resin 112 (more than half of the section) encloses the optical fiber 111. Therefore, it is preferable to leave more than half of a cross-sectional area of the cover resin 112.

Subsequently, the optical fiber fragments (the tip side from the broken line in FIG. 18) are separated in such a manner that, for example, the optical fiber is folded toward the side where the cover resin 112 is not removed to break the cover resin 112. The separated optical fiber fragments can be collected as the optical fiber 111 without being scattered. It is to be noted that the fragments of the optical fibers can also be processed without being separated, as described later.

Figure 19A:
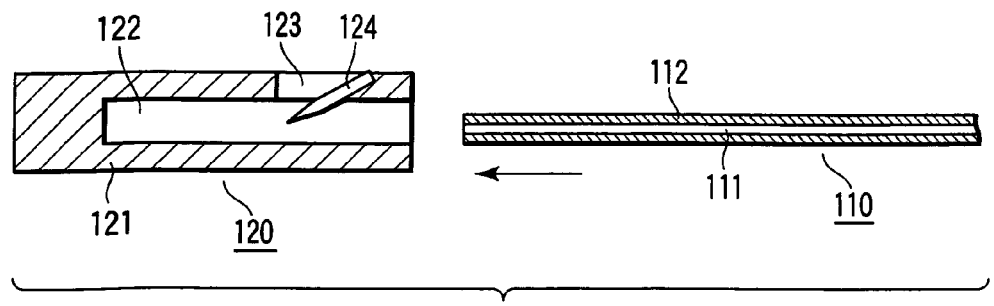
FIGS. 19A, 19B and 19C are sectional views schematically showing a cover remover to remove a cover from the ribbon optical fiber as shown in FIG. 18, and a removing process thereof.
Figure 19B:
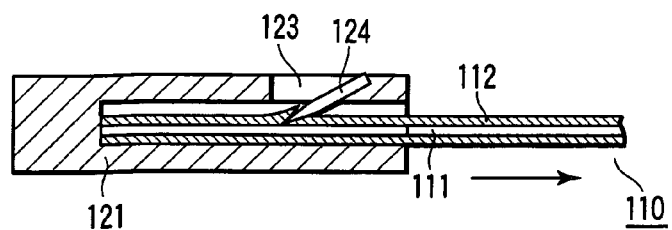
Figure 19C:
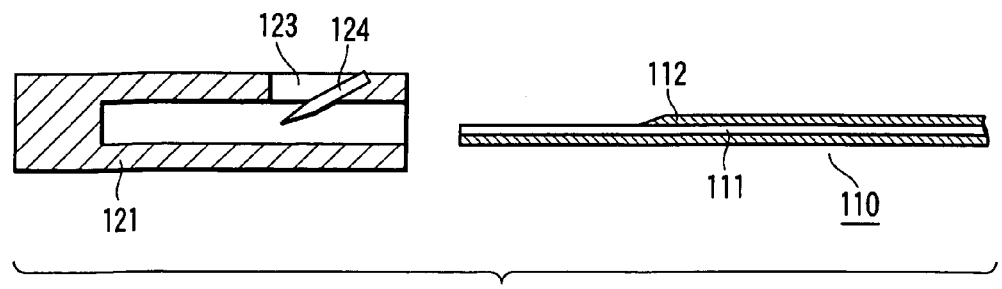

FIGS. 19A to 19C are sectional views schematically showing a process of removing the optical fiber fragments described above using the cover remover.

In FIGS. 19A to 19C, a numeral 121 denotes a base member provided with a guide slot (guide hole) 122 for the optical fiber ribbon 110, 123 denotes a discharge window for scraps, and 124 denotes a plane blade obliquely attached, for example, at 30 to 45° so that its tip is directed to an inner side of the guide slot 122. The guide slot 122 enables the optical fiber ribbon 110 to be inserted straight therein, and is provided, at its inner portion, with a wall which defines an insertion length of the optical fiber ribbon 110. Thus, the base member 121, the guide slot 122, discharge window 123 and the plane blade 124 constitute a cover remover 120.

Furthermore, the plane blade 124 is set so that a height of its tip from a bottom of the guide slot 122 is rather smaller than a distance which is a sum of the outside diameter of the optical fiber 111 and a one-side thickness of the cover resin 112. Then, when the optical fiber ribbon 110 is inserted in a direction of an arrow in FIG. 19A, the tip of the plane blade is raised so that the height of the tip from the bottom of the guide slot 122 is raised to a height corresponding to a sum of the outside diameter of the optical fiber 111 and a two-side thickness of the cover resin 112.

In order to realize, in a simplest manner, the above configuration to raise the tip of the plane blade 124, the plane blade 124 may be made relatively long so that the tip height is changed by an elastic deformation of the plane blade itself from its fixed portion to its tip. This is as if a thin razor were deformed by being pressed on a flat surface, and this configuration can be built in a relatively simple manner. Further, when the plane blade is configured as a thick blade so that it is not easily deformed considering durability and cutting properties of the plane blade 124, a large space may be secured between the tip of the plane blade 124 and the bottom of the guide slot 122, and a pressing portion may be provided to press the optical fiber ribbon 110 to the plane blade 124 at a position opposite to the plane blade 124 by use of a spring or the like.

Figure 20A:
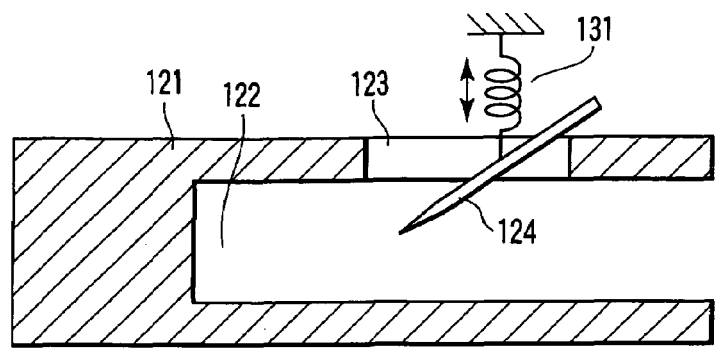
FIGS. 20A, 20B and 20C are sectional views schematically showing the cover remover to remove the cover from the ribbon optical fiber as shown in FIG. 18, and the removing process thereof.
Figure 20B:
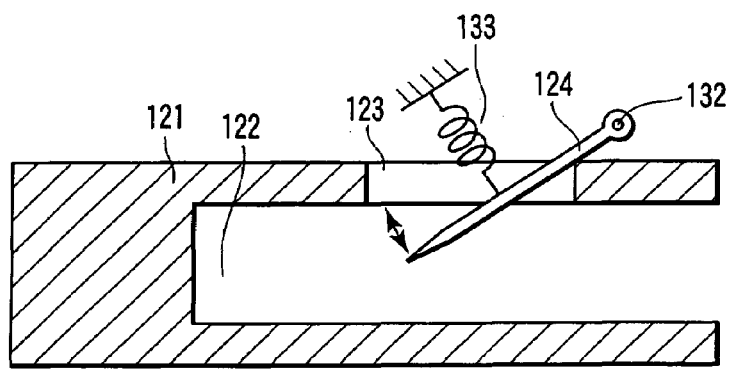
Figure 20C:
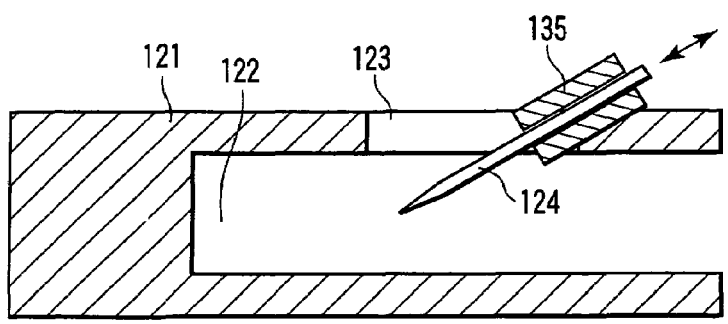

Furthermore, as shown in FIG. 20A, the bottom of the guide slot 122 remains flat, and the plane blade 124 is configured to vertically translate, so that the plane blade 124 may be pushed by a spring 31 in a manner to press the plane blade 124 onto the bottom of the guide slot 122. Moreover, as shown in FIG. 20B, the bottom of the guide slot 122 remains flat, and the tip of the plane blade 124 is configured to pivot on a shaft 32 for vertical movement, so that the plane blade 124 may be pushed by a spring 33 in a manner to press the plane blade 124 toward the bottom of the guide slot 122. Still further, as shown in FIG. 20C, the plane blade 124 may be held so that it can slide in one direction by use of a guide member 135.

Into the cover remover 120 configured as described above, the optical fiber ribbon 110 is inserted as in FIG. 9A. At this point, the tip of the optical fiber ribbon 110 is adapted to reach the wall on the inner side of the guide slot 122, the cover resin 112 is removed at about the same length every time. Then, as shown in FIG. 19B, the inserted optical fiber ribbon 110 is pulled out in a reverse direction. In this way, as shown in FIG. 19C, the cover resin 112 is partially removed in a shape as shown in FIG. 18.

Thus, if the cover remover used in this shaping method is employed, its operation only includes simply inserting and pulling out the optical fiber ribbon 110, and in the first shaping method, an operation of partially removing the cover resin 112 can be performed in a significantly simple and reproducible manner. In addition, the partial removal of the cover resin 112 using the cover remover in this shaping method provides high reproducibility in its processed shape, and the optical fiber cutter can be combined to effectively implement the shaping of the optical fiber.

Figures 21A, 21B:
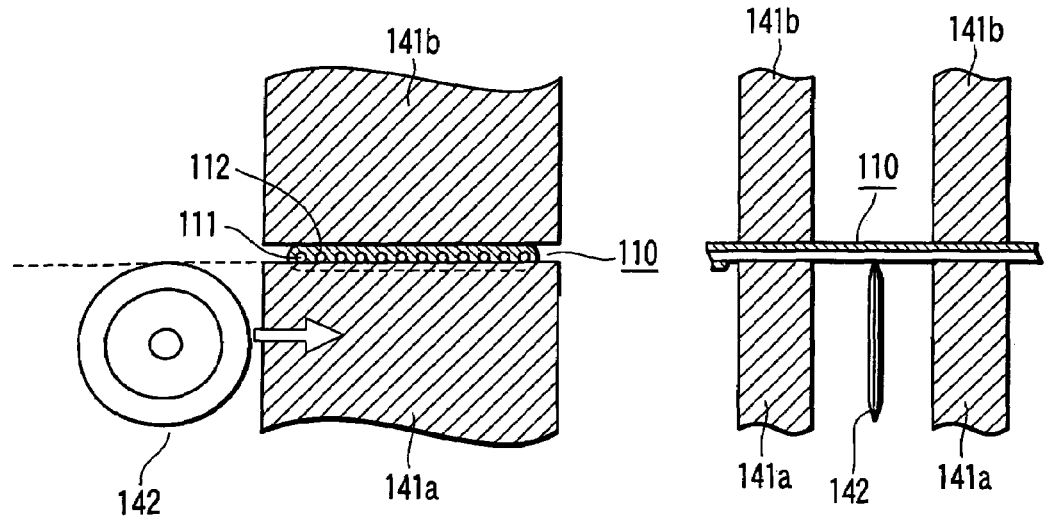
FIGS. 21A and 21B are sectional views schematically showing the cutting device which cuts, as shown in FIG. 18, the optical fiber from which a cover resin has been removed.

FIGS. 21A and 21B show how another cover remover is used to partially remove the cover resin 112 so that the optical fiber cutter causes the small slash for shaping/cutting. The cutting blade 142 shown in FIGS. 21A and 21B has its tip protruding as much as necessary to cause the small slash from an upper surface of the cramp portion 141a, and the side surface of the optical fiber 111 directly contacts the upper surface of the cramp portion 141a, thereby making it possible to cause the small slash on about the same condition every time. This is substantially equivalent to the method as shown in FIG. 15 in which the optical fiber 111 is totally exposed to cause the small slash.

Figure 22:
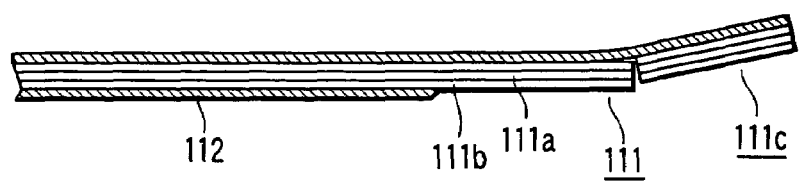
FIG. 22 is a sectional view schematically showing a cut state of the optical fiber cut in FIGS. 21A and 21B.

The processing up to the causing of the small slash is performed in the above-described process, and bending stress is applied in such a manner that the side where the small slash is caused is on the outside to achieve shaping/cutting (stress breakage), which state is shown in FIG. 22. In FIG. 22, 111a denotes a core of the optical fiber, and 111b denotes a clad. For example, in a GI (Graded Index) type multimode optical fiber having a core diameter of 50 µm and a clad diameter of 125 µm, the small slash is caused at a depth of, for example, 5 µm at which the small slash does not reach the core 111a. Further, a numeral 111c denotes a fragment produced by cutting the optical fiber, and this fragment remains at the tip of the optical fiber even after the optical fiber end face has been shaped or cut as shown in FIG. 22. Subsequently, the fragment 111c can be torn off in a manner to fold it back, but it is also possible to process the fragment in such a manner to leave it as it is, as shown below.

Figure 23:
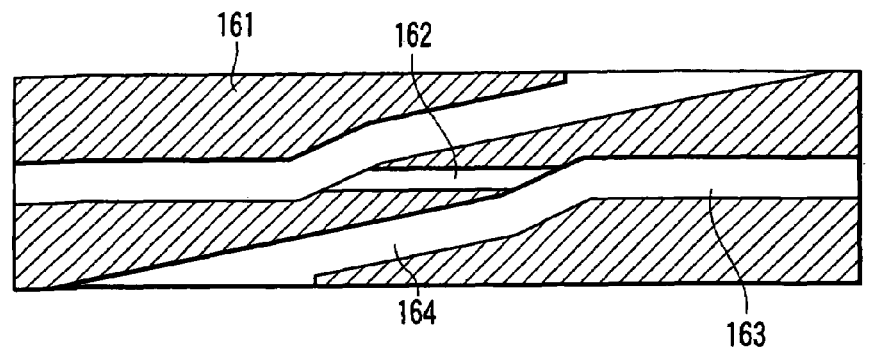
FIG. 23 is a sectional view schematically showing an optical fiber connector to connect the cut optical fibers.

FIG. 23 is a sectional view schematically showing a connector to connect the optical fibers shaped in the process above described.

In FIG. 23, a numeral 61 denotes a base member of the connector, 62 denotes an optical connecting portion to insert the optical fiber 111, 63 denotes an insertion portion to insert the optical fiber ribbon 110 together with the cover resin 112, and 64 denotes a fragment containing portion to receive the fragments produced by the shaping/cutting the optical fiber as shown in FIG. 22.

Holes having a diameter equal to that of the optical fiber ribbon 110 are provided on the same straight line from both ends in a longitudinal direction of the base member 161 to constitute the insertion portions 63, and a hole having a diameter equal to that of the optical fiber 111 is provided on the same straight line as that of the insertion portion 163 to connect both the insertion portions 63 in order to constitute the optical connecting portion 162. Moreover, a hole equal in size to the optical fiber ribbon 110 is provided in a direction inclined with respect to the insertion portion 163 to constitute the fragment containing portion 164.

For the base member 161, a resin such as epoxy resin is used in which a silica filler is mixed at about 80% to conform a thermal expansion coefficient thereof to that of the optical fiber, and it is formed into a shape as shown in FIG. 23 by die shaping. The optical connecting portion 162 is made as a cylinder having a diameter of, for example, 126 µm, so that displacement is reduced when the optical fibers 111 (whose outside diameter is 125 µm) bump into each other. The insertion portions 163 are formed at an interval of 250 µm which is an array pitch for the general ribbon optical fiber, for example, in a direction orthogonal to a surface of FIG. 23. At this point, an inclined surface produced with the material of the base member 161 is formed between the optical connecting portions (cylindrical holes), and an angle and length of the inclined surface is adjusted so that the fragment 111c of the optical fiber can pass when it is inserted from the insertion portion 163.

When the optical fiber processed as shown in FIG. 22 is inserted into the optical fiber connector configured as above, the cover resin 112 is moved under the guidance of the inclined surface between the optical connecting portions 162, and the fragment 111c of the optical fiber is drawn by the cover resin 112 and thus enters the fragment containing portion 164. If the optical fiber is further inserted, the fragment 111c which has entered the fragment containing portion 164 will enter further inward, and the optical fiber is drawn thereby to move toward the fragment containing portion 164, but the optical fiber 111 tends to move, due to its rigidity, in an extending direction of the insertion portion 163. As a result, the cover resin 112 is peeled off from the optical fiber 111, whereas the optical fiber 111 moves toward the optical connecting portion 162 and bumps into the optical fiber which has been similarly inserted from the other side, thus resulting in a state as in FIG. 24.

In this state, an optical adhesive is injected into the optical connecting portion 162 and the fragment containing portion 164 and then cured (e.g., heated), thus completing the connection of the optical fibers. For the optical adhesive, for example, a transparent epoxy-based adhesive, an acrylic-based adhesive or a silicone-based adhesive is used, and they may be cured on their curing conditions.

Figure 24:
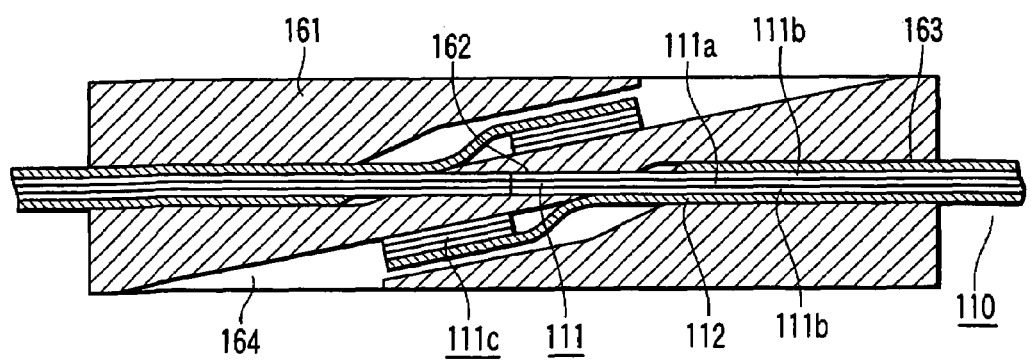
FIG. 24 is a sectional view showing a state in which the cut optical fibers are connected using the optical connector shown in FIG. 23.

In the optical fibers thus connected, it is not necessary to process, as chips, the fragments 111c produced by the shaping/cutting as shown in FIG. 24, and safety can be significantly increased in an end face shaping operation and connecting operation of the optical fibers. End processing and connecting operation of the optical fiber according to a third shaping method include simple operations such as inserting and pulling the optical fiber into/from the cover remover, a cutting operation by the general optical fiber cutter, inserting the cut optical fiber into the optical fiber connector, and injecting and curing the optical adhesive, and the chips of the optical fibers are not basically produced during these operations, and the fragments 111c are embedded and fixed into the optical fiber connector by the optical adhesive (not shown), thereby making it possible to ensure essential safety.

It is to be noted that since the process of injecting the optical adhesive can be performed before the insertion of the optical fiber to smoothly insert the optical fiber into the optical fiber connector, the optical adhesive may be injected first. Further, in the embodiment described above, the optical fiber is inserted which has previously been shaped/cut by the application of bending stress as in FIG. 22, but the optical fiber which has been only slashed may be inserted, and the optical fiber may be broken by the bending stress at a bending portion between the insertion portion 163 and the fragment containing portion 164 in FIG. 23. In that case, the optical fiber cutting operation only includes slashing, which is effective in eliminating the risk of producing the optical fiber chips due to unsuccessful breakage by the application of the bending stress.

FIG. 25 is a sectional view schematically showing another optical fiber connector to connect the optical fibers shaped in the process described above.

The optical fiber connector shown in FIG. 25 has a basic structure similar to that shown in FIG. 23 and connects the optical fibers in the same manner as the structure shown in FIG. 23, but it connects the optical fibers 110 whose tips (fragments 111c) are bent toward the side the cover resin is not removed as shown in FIG. 23.

In FIG. 25, 71 denotes a base member of the connector, 72 denotes an optical connecting portion to insert the optical fiber 111, and 73 denotes an insertion portion to insert the optical fiber ribbon 110 together with the cover resins 112.

For the base member 71, a resin such as epoxy resin is used in which the silica filler is mixed at about 80% to conform a thermal expansion coefficient thereof to that of the optical fiber, and it is formed into a shape as shown in FIG. 26 by die shaping. The optical connecting portion 72 is made as a cylinder having a diameter of, for example, 126 µm, so that displacement is reduced when the optical fibers 111 having an outside diameter of 125 µm bump into each other. The insertion portion 173 has a space which accommodates a sum value of a double outside diameter of the optical fiber 111 and a triple one-side thickness of the cover resin 112. The optical connecting portions 172 are formed at an interval of 250 μm which is an array pitch for the general ribbon optical fiber, for example, in a direction orthogonal to a surface of FIG. 26.

When the optical fiber processed as shown in FIG. 26 is inserted into the optical fiber connector configured as above, it moves in a manner led by the shaped/cut surface of the optical fiber 111, and comes into the insertion portion 173 while the optical fiber fragment 111c is folded back. When the similarly processed optical fiber is inserted from the other side, the shaped/cut surfaces of the optical fibers 111 bump into each other at the optical connecting portion 172, thus resulting in a state as in FIG. 27. In this state, the optical adhesive is injected and cured (e.g., heated), thereby completing the connection of the optical fibers. For the optical adhesive, for example, a transparent epoxy-based adhesive, an acrylic-based adhesive or a silicone-based adhesive is used, and they may be cured on their curing conditions. In addition, since the process of injecting the optical adhesive can be performed before the insertion of the optical fiber to smoothly insert the optical fiber into the optical fiber connector, the optical adhesive may be injected first.

Owing to effects of the optical fibers thus connected, it is not necessary to process, as chips, the fragments 111c produced by the shaping/cutting as shown in FIG. 27, and safety can be significantly increased in the end face shaping operation and connecting operation of the optical fibers. In this way, during the insertion of the optical fiber, since it is inserted after folding the fragment 111c, the connection of the optical fibers can be ensured without considering peeling characteristics of the cover in the optical fiber connector due to characteristics of the cover resin 112 as in the third shaping method.

As described above, according to the above shaping method, the scattering of the fragments of the optical fibers is prevented so that the end face of the optical fiber can be shaped in a safe and simple manner, and optical performance thus exerted can be equal to that when the end face shaping is implemented only with the optical fiber, thereby enabling optical connection which does not produce the fragments of the optical fibers themselves. This allows the optical fiber to be applied not only to specific fields such as the optical communications but also to universal fields, which can be a great contribution to prevalence of the optically wired device and the like leading to the upgrading of the information and communication equipment, for example.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An optoelectronic conversion header comprising:
an optical waveguide which guides an optical signal and has an end face;
a ferrule, having a mounting surface, which holds the optical waveguide in a predetermined position so that the end face of the optical waveguide protrudes from the mounting surface;
an electric wire provided on the mounting surface of the ferrule; and
an optoelectronic converter having an optical input/output surface, which is electrically connected to the electric wire and is mounted on the mounting surface of the ferrule, the optical input/output surface being faced to the end face of the optical waveguide so as to transfer the optical signal along a transfer direction between the optical input/output surface and the end face of the optical waveguide, the end face being substantially vertical to the transfer direction, and the optical input/output surface and the mounting surface being deviated two degrees or more from a plane vertical to the transfer direction.

2. The optoelectronic conversion header according to claim 1, wherein the ferrule has a side surface crossing the mounting surface, and the electric wire is formed to extend from the mounting surface to the side surface.

3. The optoelectronic conversion header according to claim 1, wherein a transparent resin is provided between the optical input/output surface and the end face of the optical waveguide.

4. The optoelectronic conversion header according to claim 1, wherein the mounting surface is substantially parallel to the optical input/output surface.

* * * * *